US012659982B2

(12) United States Patent
Kim et al.

(10) Patent No.: US 12,659,982 B2
(45) Date of Patent: Jun. 16, 2026

(54) METHOD AND APPARATUS FOR EFFECTIVELY TRANSMITTING DATA OF SMALL SIZE IN NEXT-GENERATION MOBILE COMMUNICATION SYSTEM

(71) Applicant: Samsung Electronics Co., Ltd., Suwon-si (KR)

(72) Inventors: Sangbum Kim, Suwon-si (KR); Anil Agiwal, Suwon-si (KR); Soenghun Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 435 days.

(21) Appl. No.: 17/790,641

(22) PCT Filed: Jan. 5, 2021

(86) PCT No.: PCT/KR2021/000064
§ 371 (c)(1),
(2) Date: Jul. 1, 2022

(87) PCT Pub. No.: WO2021/141347
PCT Pub. Date: Jul. 15, 2021

(65) Prior Publication Data
US 2023/0045501 A1 Feb. 9, 2023

(30) Foreign Application Priority Data

Jan. 6, 2020 (KR) ........................ 10-2020-0001611

(51) Int. Cl.
*H04W 72/542* (2023.01)
*H04L 1/00* (2006.01)
(Continued)

(52) U.S. Cl.
CPC ......... *H04W 72/542* (2023.01); *H04L 1/0007* (2013.01); *H04W 72/1263* (2013.01);
(Continued)

(58) Field of Classification Search
CPC ........... H04W 72/542; H04W 72/1263; H04W 74/002; H04W 74/0833; H04W 74/0838; H04W 74/0866; H04L 1/0007
(Continued)

(56) References Cited

U.S. PATENT DOCUMENTS 10,772,017 B2    9/2020  Kim et al.
11,240,849 B2 *  2/2022  Mazloum .............. H04W 72/20
(Continued)

FOREIGN PATENT DOCUMENTS

CN    110140414 A    8/2019
CN    110278612 A    9/2019
(Continued)

OTHER PUBLICATIONS

Zou et al. "Small Data Transmission at the Detached Machine Type-Communication Device", IEEE Xplore, 2012 (Year: 2012).*
(Continued)

*Primary Examiner* — Christopher M Crutchfield
*Assistant Examiner* — Syed Ahmed
(74) *Attorney, Agent, or Firm* — Jefferson IP Law, LLP

(57) ABSTRACT

The present disclosure relates to a communication technique for combining, with IoT technology, a 5G communication system for supporting a higher data transmission rate than a 4G system, and a system therefor. The present disclosure may be applied to intelligent services, such as smart homes, smart buildings, smart cities, smart cars or connected cars, health care, digital education, retail businesses, and security and safety related services, on the basis of 5G communication technologies and IoT-related technologies. According to various embodiments of the present invention, a method and an apparatus for effectively transmitting data of a small size in a next-generation mobile communication system may be provided.

4 Claims, 15 Drawing Sheets

(51) Int. Cl.

| | | |
|---|---|---|
| *H04W 72/1263* | (2023.01) | |
| *H04W 74/00* | (2009.01) | |
| *H04W 74/0833* | (2024.01) | |
| *H04W 74/0838* | (2024.01) | |

(52) U.S. Cl.
CPC ..... *H04W 74/002* (2013.01); *H04W 74/0833* (2013.01); *H04W 74/0838* (2024.01)

(58) Field of Classification Search
USPC ......................................................... 370/329
See application file for complete search history.

(56) References Cited

U.S. PATENT DOCUMENTS

| | | | | |
|---|---|---|---|---|
| 11,601,980 | B2 * | 3/2023 | Shih ..................... | H04B 17/318 |
| 2019/0159260 | A1 | 5/2019 | Charbit et al. | |
| 2019/0215749 | A1 | 7/2019 | Shih et al. | |
| 2019/0261234 | A1 | 8/2019 | Park et al. | |
| 2019/0289661 | A1 | 9/2019 | Chen | |
| 2019/0357085 | A1 * | 11/2019 | Chervyakov ......... | H04L 1/0009 |
| 2022/0094495 | A1 * | 3/2022 | Wang .................... | H04L 5/0064 |
| 2023/0180223 | A1 * | 6/2023 | Tseng .................. | H04W 56/001 |
| | | | | 370/329 |
| 2024/0333440 | A1 * | 10/2024 | Awad .................... | H04L 5/0098 |
| 2025/0220526 | A1 * | 7/2025 | Jeon .................. | H04W 72/0453 |

FOREIGN PATENT DOCUMENTS

| | | | |
|---|---|---|---|
| EP | 3 361 820 | A1 | 8/2018 |
| KR | 10-2020-0066917 | A | 6/2020 |
| WO | 2018/062957 | A1 | 4/2018 |
| WO | 2019/099361 | A1 | 5/2019 |
| WO | 2019/134593 | A1 | 7/2019 |

OTHER PUBLICATIONS

Zou et al. "Small Data Transmission at the Detached MachineType-Communication Device", IEEE Xplore, 2012—included in last OA. (Year: 2012) (Year: 2012).*

LG Electronics: "Data transmission during random access procedure in MTC", R1-1806586.

European Search Report dated Dec. 22, 2022, issued in European Application No. 21738345.4.

5G; NR; Medium Access Control (MAC) protocol specification (3GPP TS 38.321 version 15.7.0 Release 15)', ETSI TS 138 321 V15.7.0 (Oct. 2019), Seep. 27, 2019.

Intel Corporation, 'EDT when resuming in a new eNB', R2-1818654, 3GPP TSG RAN WG2 Meeting #104, Spokane, USA, Nov. 17, 2018.

Sierra Wireless, 'Efficient and configurable DL EDT', R2-1818164, 3GPP TSG RAN WG2 Meeting #104, Spokane, USA, Nov. 2, 2018.

Huawei et al., 'Quality report in Msg3', R2-1816918, 3GPP TSG RAN WG2 Meeting #104, Spokane, USA, Nov. 2, 2018.

3GPP TS 38.331 V15.7.0 (Sep. 2019) 3rd Generation Partnership Project; Technical Specification Group Radio Access Network; NR; Radio Resource Control (RRC) protocol specification (Release 15).

3GPP TS 37.320 V15.0.0 (Jun. 2018) 3rd Generation Partnership Project; Technical Specification Group Radio Access Network; Universal Terrestrial Radio Access (UTRA) and Evolved Universal Terrestrial Radio Access (E-UTRA); Radio measurement collection for Minimization of Drive Tests (MDT); Overall description; Stage 2 (Release 15).

LG Electronics; Data transmission during random access procedure in MTC; 3GPP TSG RAN WG1 Meeting #92bis; R1-1804516; Sanya, China; Apr. 16-20, 2018.

Chinese Office Action with English translation dated Nov. 29, 2024; Chinese Appln. No. 202180017556.X.

Korean Office Action with English translation dated Apr. 11, 2025; Korean Appln. No. 10-2020-0001611.

\* cited by examiner (a) EDT for Control Plane CIoT EPS Optimizations

FIG. 5

(b) EDT for User Plane CIoT EPS Optimizations (a)

Figure 15:
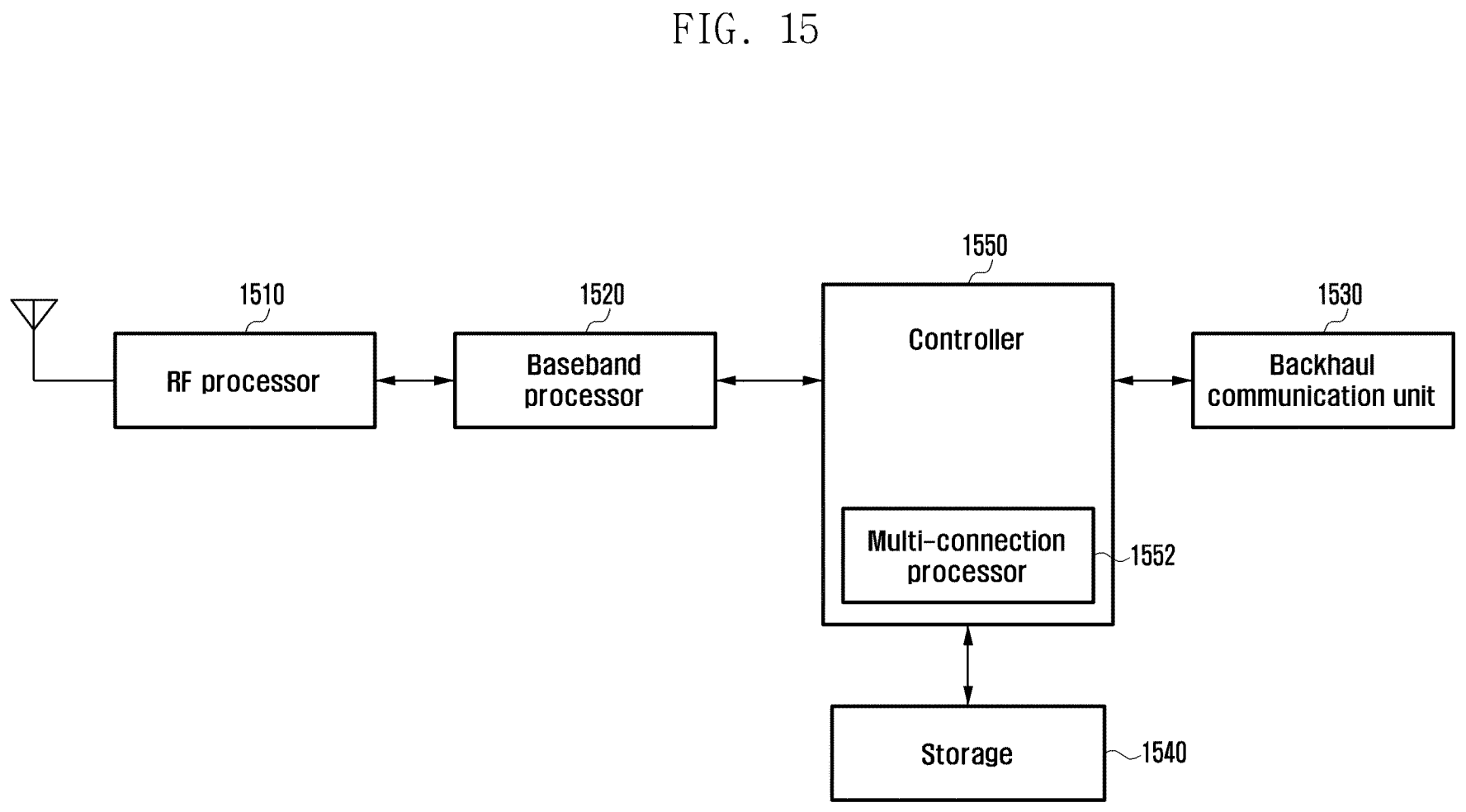

1530 Backhaul communication unit

1550 Controller

1552 Multi-connection processor

1540 Storage

1520 Baseband processor

1510 RF processor

METHOD AND APPARATUS FOR EFFECTIVELY TRANSMITTING DATA OF SMALL SIZE IN NEXT-GENERATION MOBILE COMMUNICATION SYSTEM

TECHNICAL FIELD

The disclosure relates to a method and apparatus for transmitting and receiving user data of a small size when a terminal in an idle mode (RRC_idle) or an inactive mode (RRC_inactive) performs a random access procedure with a base station without switching to a connected mode (RRC_connected) in a mobile communication system.

BACKGROUND ART

To meet the demand for wireless data traffic having increased since deployment of 4G communication systems, efforts have been made to develop an improved 5G or pre-5G communication system. Therefore, the 5G or pre-5G communication system is also called a Beyond 4G Network or a Post LTE System. The 5G communication system is considered to be implemented in higher frequency (mm-Wave) bands, e.g., 60 GHz bands, so as to accomplish higher data rates. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G communication systems. In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like. In the 5G system, hybrid FSK and QAM modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as sensing technology, wired/wireless communication and network infrastructure, service interface technology, and security technology, have been demanded for IoT implementation, a sensor network, a machine-to-machine (M2M) communication, machine type communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

In line with this, various attempts have been made to apply 5G communication systems to IoT networks. For example, technologies such as a sensor network, machine to machine (M2M) communication, and machine type communication (MTC) may be implemented by beamforming, MIMO, and array antennas. Application of a cloud radio access network (RAN) as the above-described Big Data processing technology may also be considered to be as an example of convergence between the 5G technology and the IoT technology.

DISCLOSURE OF INVENTION

Technical Problem

The disclosure proposes a technique for transmitting and receiving user data of a small size when a terminal in an idle mode (RRC_idle) or an inactive mode (RRC_inactive) performs a random access procedure with a base station without switching to a connected mode (RRC_connected) in a mobile communication system.

In addition, using an early data transmission (EDT) technique, the disclosure proposes a method for a terminal to transmit user data to a base station in an uplink (mobile originated-initiated, MO) and a method for a base station to transmit user data to a terminal in a downlink (mobile terminated, MT).

Solution to Problem

According to an embodiment of the disclosure, a method performed by a terminal in a wireless communication system may include receiving, from a base station, system information including configuration information related to early data transmission (EDT) for a normal uplink (NUL), configuration information related to EDT for a supplementary uplink (SUL), and reference signal received power (RSRP) threshold information for determining whether to apply the SUL; based on the system information, determining whether to trigger a random access for EDT and determining an uplink for performing the random access for the EDT; and performing the random access for the EDT through the determined uplink to the base station in case that the random access for the EDT is triggered.

In addition, according to another embodiment of the disclosure, a method performed by a base station in a wireless communication system may include transmitting, to a terminal, system information including configuration information related to early data transmission (EDT) for a normal uplink (NUL), configuration information related to EDT for a supplementary uplink (SUL), and reference signal received power (RSRP) threshold information for determining whether to apply the SUL; and receiving, from the terminal, a random access preamble for the EDT through an uplink determined for performing a random access for the EDT, wherein the uplink determined for performing the random access for the EDT and whether to trigger the random access for the EDT are based on the system information.

In addition, according to still another embodiment of the disclosure, a terminal in a wireless communication system may include a transceiver; and a controller configured to receive, from a base station, system information including configuration information related to early data transmission (EDT) for a normal uplink (NUL), configuration information related to EDT for a supplementary uplink (SUL), and reference signal received power (RSRP) threshold information for determining whether to apply the SUL, to, based on the system information, determine whether to trigger a random access for EDT and determine an uplink for performing the random access for the EDT, and to perform the random access for the EDT through the determined uplink to the base station in case that the random access for the EDT is triggered.

In addition, according to yet another embodiment of the disclosure, a base station in a wireless communication system may include a transceiver; and a controller configured to transmit, to a terminal, system information including configuration information related to early data transmission (EDT) for a normal uplink (NUL), configuration information related to EDT for a supplementary uplink (SUL), and reference signal received power (RSRP) threshold information for determining whether to apply the SUL, and to receive, from the terminal, a random access preamble for the EDT through an uplink determined for performing a random access for the EDT, wherein the uplink determined for performing the random access for the EDT and whether to trigger the random access for the EDT are based on the system information.

Advantageous Effects of Invention

According to an embodiment of the disclosure, when a terminal needs to transmit data of a small size through an uplink, data can be effectively transmitted using a control plane (CP) EDT.

In addition, according to another embodiment of the disclosure, when the terminal needs to transmit data of a small size through the uplink, data can be effectively transmitted using a user plane (UP) EDT.

In addition, according to still another embodiment of the disclosure, when a base station needs to transmit data of a small size through a downlink, data can be effectively transmitted using the CP EDT.

In addition, according to yet another embodiment of the disclosure, when the base station needs to transmit data of a small size through the downlink, data can be effectively transmitted using the UP EDT.

BRIEF DESCRIPTION OF DRAWINGS

FIG. 5 is an operation sequence of a UE, an eNB, a mobility management entity (MME), and a serving gateway (S-GW) to explain an uplink EDT operation in a four-step random access procedure according to an embodiment of the disclosure.

FIG. 15 is a block diagram illustrating an internal structure of a base station according to an embodiment of the disclosure.

MODE FOR THE INVENTION

Figure 1:
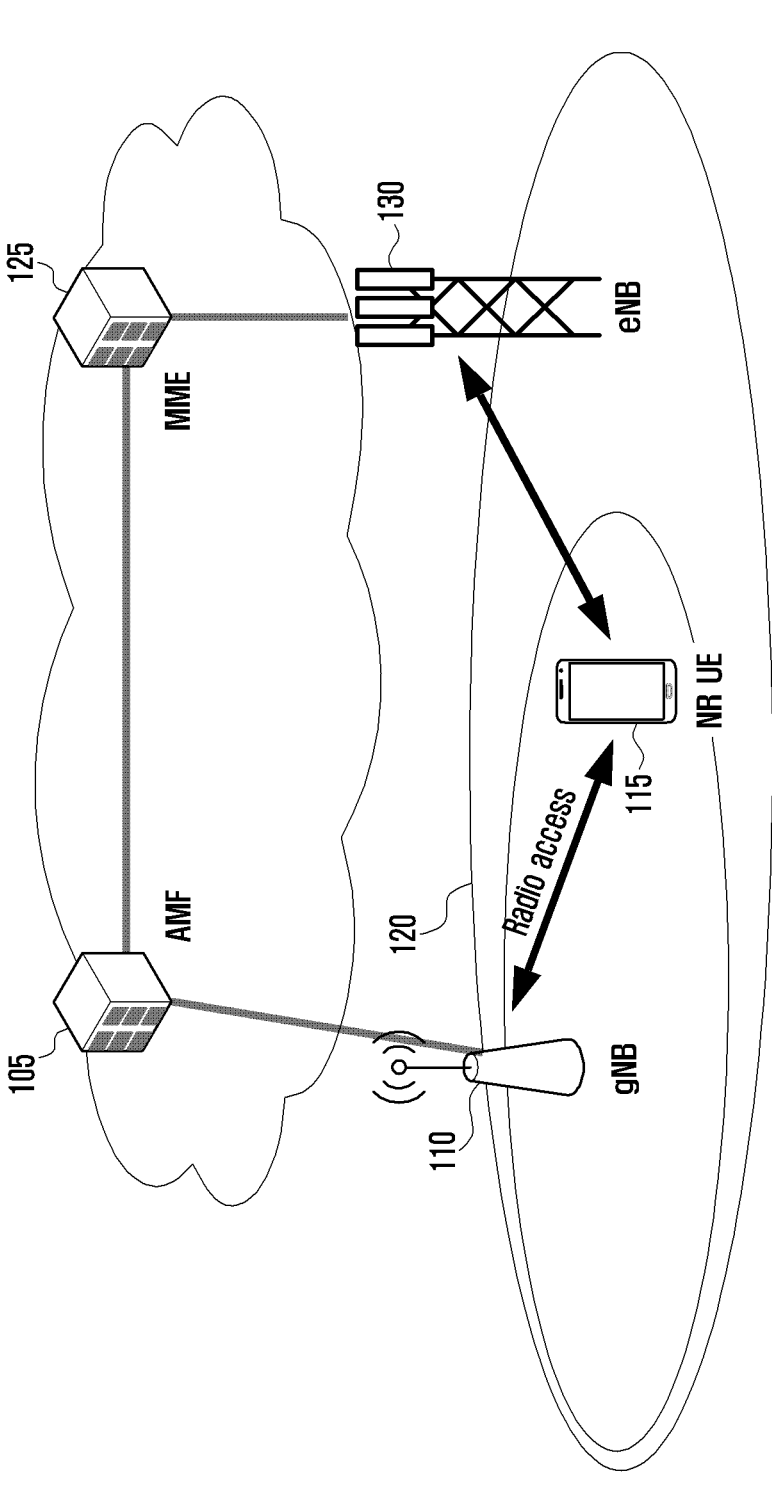
FIG. 1 is a diagram illustrating a structure of a next-generation mobile communication system.

In describing embodiments, descriptions of technical contents that are well known in the technical field to which the disclosure pertains and are not directly related to the disclosure will be omitted. This is to more clearly convey the subject matter of the disclosure without obscuring it by omitting unnecessary description.

For the same reason, some elements are exaggerated, omitted, or schematically illustrated in the accompanying drawings. In addition, the depicted size of each element does not fully reflect the actual size. In the drawings, the same or corresponding elements are assigned the same reference numerals.

The advantages and features of the disclosure and the manner of achieving them will become apparent through embodiments described below with reference to the accompanying drawings. The disclosure may be, however, embodied in many different forms and should not be construed as being limited to the embodiments set forth herein. Rather, these embodiments are provided so that the disclosure will be thorough and complete and will fully convey the scope of the disclosure to those skilled in the art. The disclosure is only defined by the scope of the appended claims. Throughout the specification, the same reference numerals refer to the same constitutional elements.

It will be understood that each block of the flowchart illustrations, and combinations of blocks in the flowchart illustrations, may be implemented by computer program instructions. These computer program instructions may be provided to a processor of a general purpose computer, special purpose computer, or other programmable data processing apparatus to produce a machine, such that the instructions, which are executed via the processor of the computer or other programmable data processing apparatus, generate means for implementing the functions specified in the flowchart block(s). These computer program instructions may also be stored in a computer usable or computer-readable memory that may direct a computer or other programmable data processing apparatus to function in a particular manner, such that the instructions stored in the computer usable or computer-readable memory produce an article of manufacture including instruction means that implement the function specified in the flowchart block(s). The computer program instructions may also be loaded onto a computer or other programmable data processing apparatus to cause a series of operational steps to be performed on the computer or other programmable apparatus to produce a computer implemented process such that the instructions that are executed on the computer or other programmable apparatus provide steps for implementing the functions specified in the flowchart block(s).

In addition, each block of the flowchart illustrations may represent a module, segment, or portion of code, which comprises one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

As used herein, the term "unit" refers to a software element or a hardware element, such as a field programmable gate array (FPGA) or an application specific integrated circuit (ASIC), which performs a predetermined function. However, the term "unit" does not always have a meaning limited to software or hardware. The "unit" may be constructed either to be stored in an addressable storage medium or to execute one or more processors. Therefore, the "unit" includes, for example, software elements, object-oriented software elements, class elements or task elements, processes, functions, properties, procedures, subroutines, segments of a program code, drivers, firmware, micro-codes, circuits, data, database, data structures, tables, arrays, and variables. The functions provided by elements and units may be combined into those of a smaller number of elements and units or separated into those of a larger number of elements and units. In addition, the elements and units may be implemented to operate one or more central processing units (CPUs) within a device or a secure multimedia card.

Hereinafter, embodiments of the disclosure will be described with reference to the accompanying drawings.

FIG. 1 is a diagram illustrating a structure of a next-generation mobile communication system.

FIG. 1 shows an EN-DC structure of a next-generation mobile communication system.

The EN-DC refers to dual connectivity of the LTE system (EUTRAN) and the next-generation mobile communication system (NR), and is a scenario in which one UE is simultaneously connected to two heterogeneous systems to receive a service.

With reference to FIG. 1, as shown, a radio access network of the next-generation mobile communication system may be composed of a next-generation base station 110 (i.e., new radio node B, hereinafter, gNB) 110 and an AMF 105 (i.e., new radio core network). The UE 115 (i.e., new radio user equipment, hereinafter NR UE or UE) may access an external network through the gNB 110 and the AMF 105.

In FIG. 1, the gNB 110 may correspond to an evolved Node B (eNB) in the legacy LTE system. The gNB is connected to the NR UE 115 via a wireless channel, and may provide a better service compared to the legacy nodeB. In the next-generation mobile communication system, because all user traffics are serviced via a shared channel, a device that collects state information of UEs, such as a buffer status, an available transmission power status, or a channel status, and performs scheduling may be needed, and the gNB 110 may be responsible for this. Generally, one gNB may control a plurality of cells. In order to implement high-speed data transmission compared to the legacy LTE, the gNB 110 may have more than the existing maximum bandwidth, and additionally beamforming technology using orthogonal frequency division multiplexing (hereinafter referred to as OFDM) may be used as a radio access technology. Also, an adaptive modulation and coding (AMC) scheme that determines a modulation scheme and a channel coding rate depending on the channel status of the UE may be applied. The AMF 105 may perform functions such as mobility support, bearer setup, and quality of service (QoS) setup. The AMF is a device in charge of various control functions as well as a mobility management function for a terminal, and may be connected to a plurality of base stations. Also, the next-generation mobile communication system may be linked with the legacy LTE system, and the AMF is connected to the MME 125 through a network interface. The MME may be connected to the legacy base station, the eNB 130. In the EN-DC scenario, the gNB may be controlled by being connected to the eNB.

Figure 2:
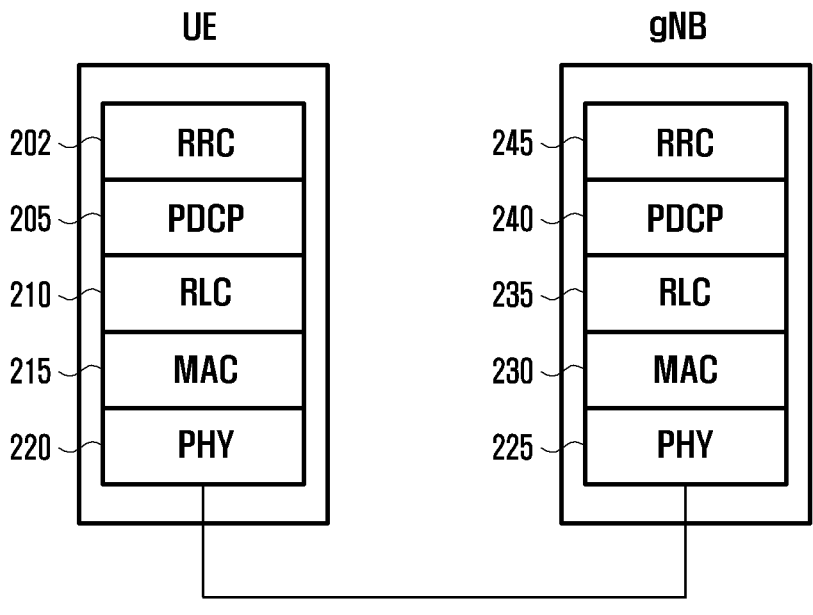
FIG. 2 is a diagram illustrating a radio protocol structure in a mobile communication system according to an embodiment of the disclosure.

FIG. 2 is a diagram illustrating a radio protocol structure in a mobile communication system according to an embodiment of the disclosure.

A control plane (CP) radio protocol of the mobile communication system is composed of a radio resource control (RRC) 202 or 245, a packet data convergence protocol (PDCP) 205 or 240, a radio link control (RLC) 210 or 235, and a medium access control (MAC) 215 or 230 in each of the UE and the gNB. The RRC 202 or 245 may be in charge of RRC connection and mobility support related configuration. The PDCP 205 or 240 may be in charge of operations such as IP header compression/restoration. The RLC 210 or 235 may reconfigure a PDCP protocol data unit (PDCP PDU) to an appropriate size and perform an automatic repeat request (ARQ) operation, etc. The MAC 215 or 230 may be connected to several RLC layer devices configured in one UE, and may perform operations of multiplexing RLC PDUs to MAC PDUs and demultiplexing RLC PDUs from MAC PDU. A physical layer 220 or 225 may perform operations of channel-coding and modulating upper-layer data, making OFDM symbols, and transmitting them over a radio channel, or demodulating and channel-decoding OFDM symbols received through the radio channel and delivering them to an upper layer.

Figure 3:
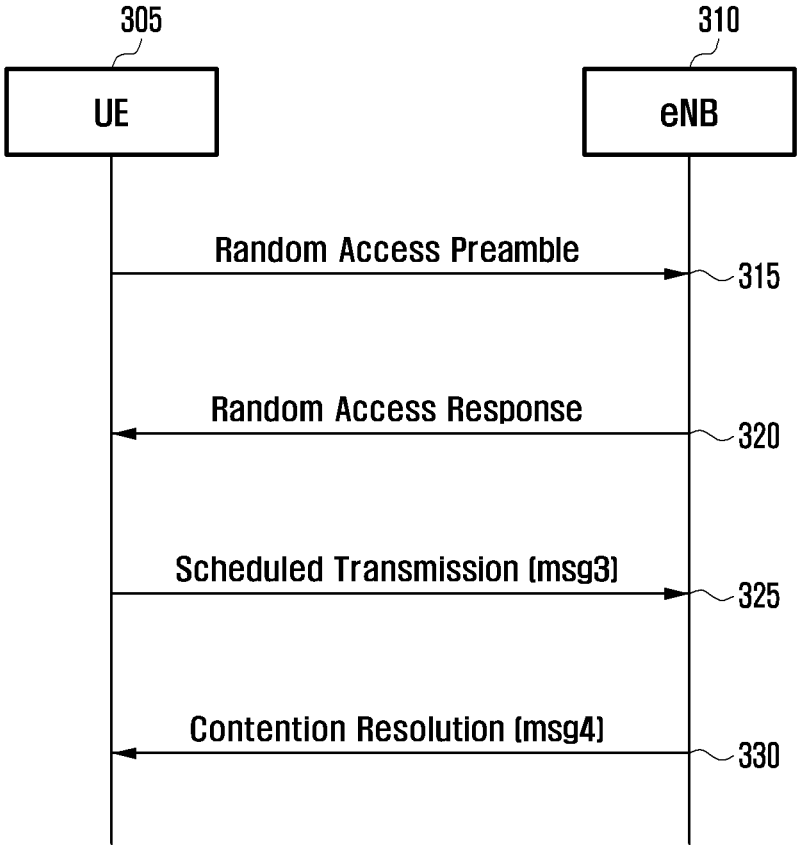
FIG. 3 is a diagram illustrating an operation sequence of a base station and a UE in order to explain a random access procedure according to an embodiment of the disclosure.

FIG. 3 is a diagram illustrating an operation sequence of a base station and a UE in order to explain a random access procedure according to an embodiment of the disclosure.

The random access procedure may be performed upon synchronizing an uplink or transmitting data over a network. Specifically, it may be performed when switching from an idle mode to a connected mode, when performing RRC reestablishment, when performing handover, when starting uplink data, or when starting downlink data. Upon receiving a dedicated preamble from a base station (eNB) 310, a UE 305 may apply the preamble and thereby transmit the preamble. Otherwise, the UE may select one of two preamble groups and select a preamble belonging to the selected group. These groups may be referred to as a group A and a group B. If a channel quality state is better than a specific threshold and the size of msg3 is greater than a specific threshold, the preamble belonging to the group B is selected, otherwise the preamble belonging to the group A may be selected. If the preamble is transmitted in the nth subframe (step 315), a random access response (RAR) window may be started from the n+3rd subframe, and it may be monitored whether the RAR is transmitted within the window time interval (step 320). Scheduling information of the RAR may be indicated by a random access—radio network temporary identity (RA-RNTI) of a physical down-link control channel (PDCCH). The RA-RNTI may be derived using a radio resource location on the time and frequency axes used to transmit the preamble. The RAR message may contain a timing advance command, an uplink grant, and a temporary cell radio network temporary identity (C-RNTI). If the RAR is successfully received in the RAR window, msg3 may be transmitted using the UL grant information contained in the RAR message (step 325). Depending on the purposes of the random access, different kinds of information may be contained in the msg3. A table below is an example of information contained in the msg3.

TABLE 1

| CASE | Message 3 Contents |
| --- | --- |
| RRC CONNECTION SETUP | CCCH SDU |
| RRC RE-ESTABLISHMENT | CCCH SDU, BSR (if grant is enough), PHR (if triggered & grant is enough) |
| Handover (random preamble) | C-RNTI CE, BSR, PHR, (part of) DCCH SDU |
| Handover (dedicate preamble) | BSR, PHR, (part of) DCCH SDU |
| UL resume | C-RNTI CE, BSR, PHR, (part of) DCCH/DTCH SDU |
| PDCCH order (random preamble) | C-RNTI CE, BSR, PHR, (part of) DCCH/DTCH SDU |
| PDCCH order (dedicate preamble) | BSR, PHR, (part of) DCCH/DTCH SDU |

If the RAR is received in the nth subframe, the msg3 may be transmitted in the n+6th subframe. From the msg 3, hybrid automatic repeat request (HARQ) may be applied. After the msg3 is transmitted, the UE drives a specific timer and may monitor a contention resolution (CR) message until the timer expires (step 330). The CR message may include, in addition to the CR MAC CE, an RRC connection setup message or an RRC connection reestablishment message depending on the purpose of random access. The disclosure proposes a technique for transmitting and receiving user data of a predetermined small size when the UE in an idle mode (RRC_idle) or an inactive mode (RRC_inactive) performs a random access procedure with the base station without switching to a connected mode (RRC_connected) in the mobile communication system. In the disclosure, this technique may be referred to as early data transmission (EDT). The disclosure proposes, using the EDT technique, a method for the UE to transmit user data to the base station in an uplink (mobile originated-initiated, MO) and a method for the base station to transmit user data to the UE in a downlink (mobile terminated, MT). In the disclosure, the above uplink transmission may be referred to as uplink early data trans-mission (UL EDT), and the above downlink transmission may be referred to as downlink early data transmission (DL EDT). The disclosure is characterized in that the user data is transmitted in a four-step random access procedure. The details of the disclosure may be described based on the NR system.

Figure 4:
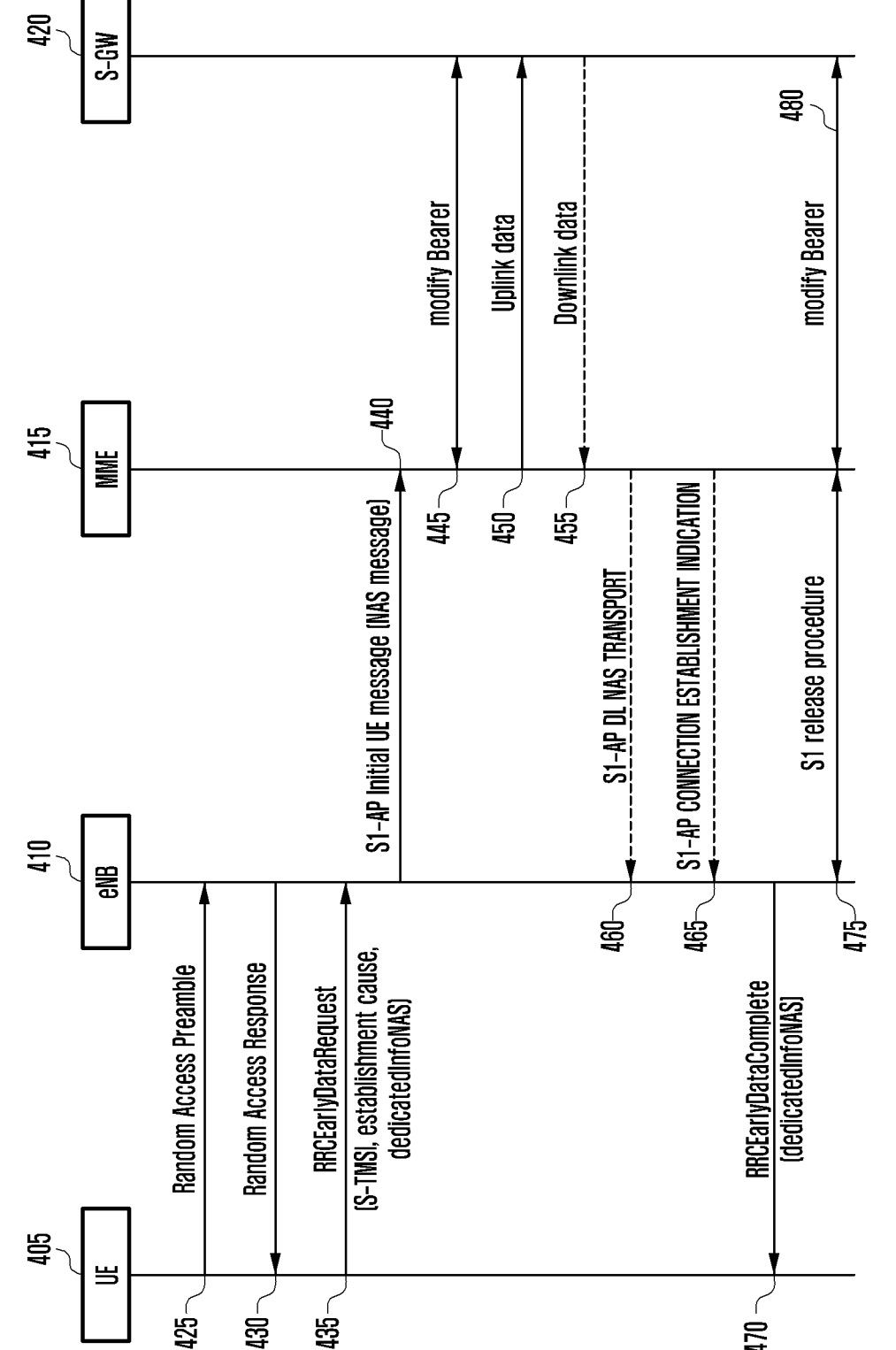
FIG. 4 is an operation sequence of a UE, an eNB, a mobility management entity (MME), and a serving gateway (S-GW) to explain an uplink EDT operation in a four-step random access procedure according to an embodiment of the disclosure.

FIG. 4 is an operation sequence of a UE, an eNB, a mobility management entity (MME), and a serving gateway (S-GW) to explain an uplink EDT operation in a four-step random access procedure according to an embodiment of the disclosure.

In particular, FIG. 4 shows a flowchart of the UL EDT operation in the 4-step random access procedure in the LTE system.

A method for transmitting user data to the base station in the 4-step random access procedure may include a control plane (CP) EDT and a user plane (UP) EDT.

FIG. 4 is a flowchart of the CP EDT operation. The CP EDT may have the following characteristics.

Uplink user data may be transmitted while being con-tained in a non-access stratum (NAS) container of an RRCEarlyDataRequest message which is one RRC message belonging to a common control channel (CCCH).

Optionally, downlink user data may be transmitted while being contained in the NAS container of an RRCEar-lyDataComplete message which is one RRC message belonging to the CCCH.

In the above process, switching to the RRC connected mode does not occur.

If there is a request for uplink user data transmission from the upper layer of the UE in the connection establishment request process, the UE 405 may initialize the EDT process in accordance with a predetermined condition, and select one configured random access preamble for the EDT process (step 425).

The eNB 410 may transmit a random access response message (RAR message) for the preamble to the UE (step 430).

The UE may include the NAS container (NAS message) containing the user data in the RRCEarlyDataRequest mes-sage, which is one RRC message belonging to the CCCH, and transmit it to the eNB (step 435).

The eNB may include the NAS container in an S1 application protocol (S1-AP) Initial UE message and trans-mit it to the MME 415 (or AMF) (step 440). At this time, an S1 connection may be established. In this process, the eNB may indicate to the MME that this connection is triggered by the EDT.

The MME may request the S-GW 420 to reactivate an EPS bearer for the UE (step 445) and may transmit the user data to the S-GW (step 450). If downlink user data for the UE is valid, the S-GW may transmit the downlink user data to the MME (step 455).

Upon receiving the downlink user data, the MME may transmit the data to the eNB through a DL NAS transport process (step 460). Alternatively, the MME may trigger an S1-AP connection establishment indication process (step 465). The eNB may include the downlink user data in the NAS container of the RRCEarlyDataComplete message, which is one RRC message belonging to the CCCH, and transmit it to the UE (step 470). If the MIME does not provide the downlink user data, the eNB may transmit the RRCEarlyDataComplete message to the UE without the downlink user data.

Thereafter, the S1 connection may be released (step 475), and the EPS bearer may be deactivated (step 480).

If additional data transmission/reception is required, the MME or the eNB may switch the UE to a connected mode. If this switching is triggered, the eNB may transmit an RRCConnectionSetup message to the UE instead of the RRCEarlyDataComplete message. This means that a typical RRC connection establishment process is triggered.

Figure 5:
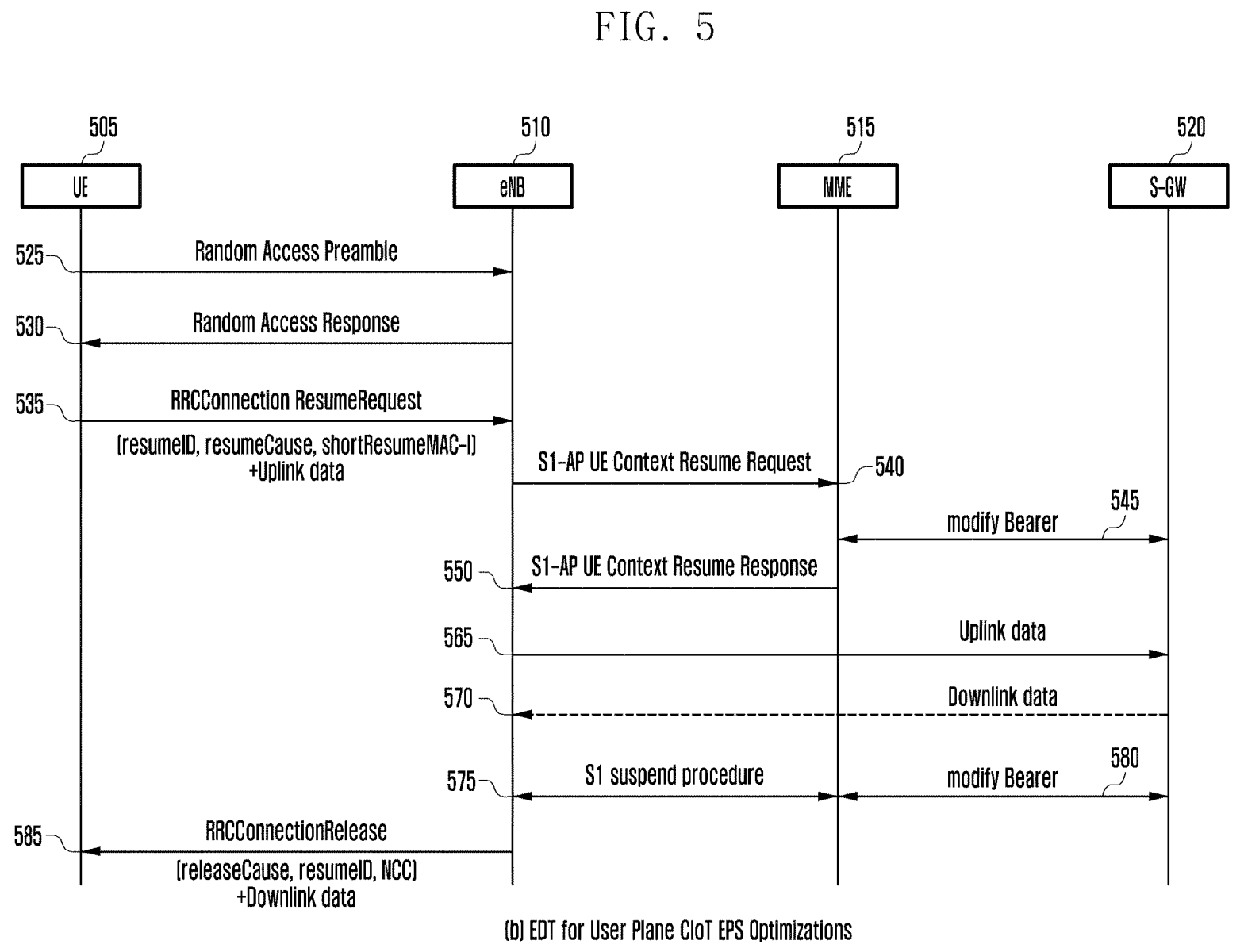

FIG. 5 is an operation sequence of a UE, an eNB, a mobility management entity (MME), and a serving gateway (S-GW) to explain an uplink EDT operation in a four-step random access procedure according to an embodiment of the disclosure.

In particular, FIG. 5 is a flowchart of the UP EDT operation. The UP EDT has the following characteristics.

In order for the UP EDT to be triggered, the UE should receive in advance an RRC connection release (RRC-ConnectionRelease or RRCRelease) message instruct-ing to switch to the inactive mode, and then be in the inactive mode. In this case, NextHopChainingCount information may be provided to the UE through the RRC message.

Uplink user data is transmitted through a dedicated traffic channel (DTCH) and may be multiplexed into an RRCConnectionResumeRequest message which is one RRC message belonging to the CCCH. That is, this RRC message and the DTCH may be contained together in the msg3.

Optionally, downlink user data may be transmitted through the DTCH and may be multiplexed into an RRCConnectionRelease message which is one RRC message belonging to the DCCH. That is, this RRC message and the DTCH may be contained together in the msg 4.

For the RRCConnectionResumeRequest message, short resume MAC-I is reused as an authentication token and may be derived using an integrity key used in the previous connection.

The above uplink and downlink user data may be ciphered. Security keys to be applied may be derived using NextHopChainingCount provided in the RRC-ConnectionRelease message in the previous connection.

Using newly derived security keys, the RRCConnection-Release message in the msg 4 may have integrity and be ciphered.

In the above process, switching to the RRC connected mode does not occur.

If there is a request for uplink user data transmission from the upper layer of the UE in the connection establishment request process, the UE 505 may initialize the EDT process in accordance with a predetermined condition, and select one configured random access preamble for the EDT process (step 525).

The eNB 510 may transmit a random access response message (RAR message) for the preamble to the UE (step 530).

The UE may transmit the RRCConnectionResumeRequest message including a Resume ID, an establishment cause, and an authentication token to the eNB (step 535). The UE may restart all of a signaling radio bearer (SRB) and a data radio bearer (DRB), derive new security keys by using the NextHopChainingCount included in the RRCConnectionRelease message received in the previous connection, and re-establish an application security (AS). Uplink user data is ciphered and transmitted through the DTCH and may be multiplexed into the RRCConnectionResumeRequest message which is one RRC message belonging to the CCCH. The eNB may trigger an S1-AP context resume process (step 540) and restart an S1 connection. Then, the MME 515 may reactivate an S1-U bearer.

The MME may request the S-GW 520 to reactivate the S1-U bearer for the UE. The MME may response to the eNB through a UE context resumption message (step 550).

The eNB receiving the uplink user data from the UE may transmit the uplink user data to the S-GW (step 565).

If downlink user data for the UE is valid, the S-GW may transmit the downlink user data to the eNB (step 570).

If there is no additional data from the S-GW, the eNB may trigger a suspension for the S1 connection (step 575) and deactivation of the S1-U bearer (step 580).

In order to switch the UE back to the inactive (RRC_inactive) mode, the eNB may transmit the RRCConnectionRelease message including a release cause indicated as 'rrc_Suspend', a resume ID, a NextHopChainingCount, and a drb-ContinueROHC to the UE (step 585). This listed information may be stored in the UE. If there is downlink user data, this data may be transmitted through the DTCH and may be multiplexed into the RRCConnectionRelease message which is one RRC message belonging to the DCCH.

If additional data transmission/reception is required, the MME or the eNB may switch the UE to a connected mode. If this switching is triggered, the eNB may transmit an RRCConnectionResume message to the UE instead of the RRCConnectionRelease message. This means that a typical RRC connection establishment process is triggered. The data is transmitted through the DTCH and may be multiplexed into the RRCConnectionResume message which is one RRC message.

Figure 6:
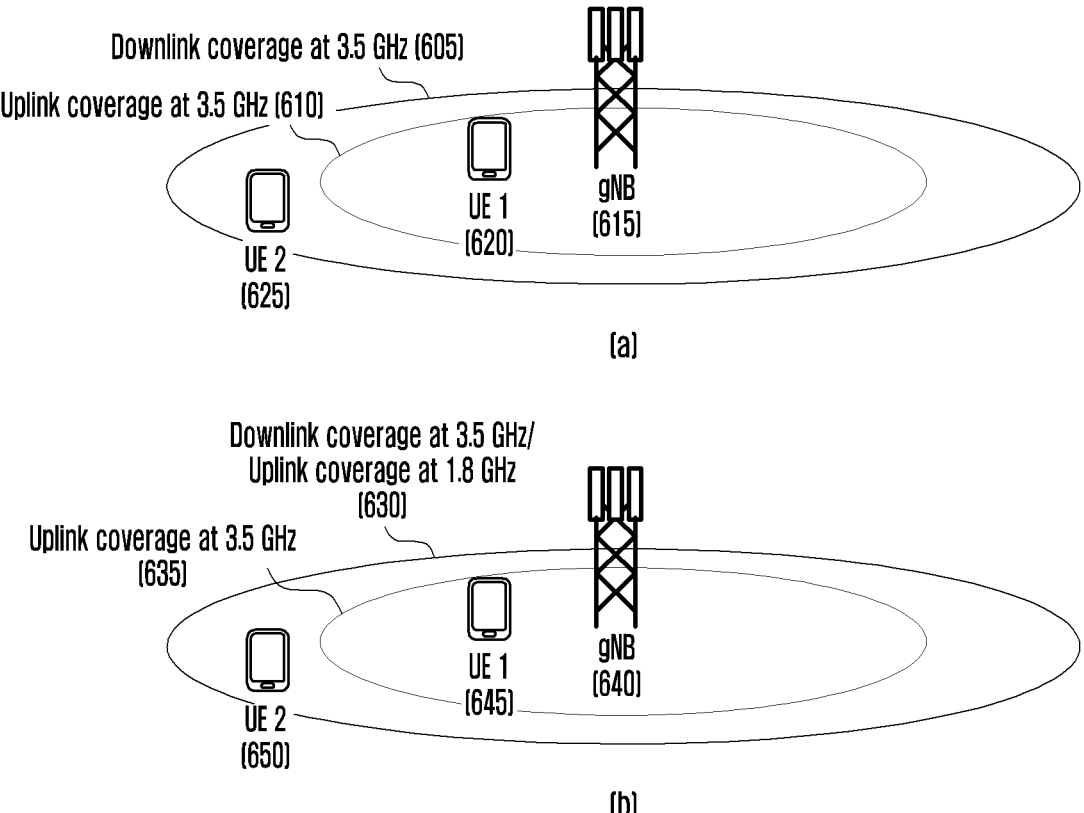
FIG. 6 is a diagram illustrating an example of applying an additional uplink frequency according to an embodiment of the disclosure.

FIG. 6 is a diagram illustrating an example of applying an additional uplink frequency according to an embodiment of the disclosure.

In the mobile communication system, a phenomenon that service areas are mismatched in uplink and downlink may occur. This mismatch may occur due to different uplink and downlink channel characteristics, maximum transmit power limitation of the UE, or a structural limitation of a transmit antenna. In general, the downlink service area may be wider than the uplink service area. For example, in a TDD system of 3.5 GHz, the downlink service area 605 is wider than the uplink service area 610. In this case, a first UE 620 has no problem in using a service in the uplink and downlink, but a second UE 625 may have a problem in successfully transmitting data to a base station (gNB) 615 in the uplink. Therefore, in order to eliminate the problem caused by the mismatch, the effective service area of the downlink may be reduced to match the uplink. That is, although a wider service area can be provided in the downlink, it is limited to the service area of the uplink.

In the next-generation mobile communication system, in order to solve the performance limitation due to this mismatch, the UE is enabled to apply an uplink frequency with a wider service area. For example, an uplink 630 of 1.8 GHz separate from an uplink of 3.5 GHz may be additionally provided to the UE. The additional uplink frequency may be referred to as a supplementary uplink (SUL) frequency. In terms of frequency characteristics, the lower the frequency band, the longer the radio signal propagation distance. Thus, 1.8 GHz, which is lower than 3.5 GHz, enables a wider service area. Accordingly, a second UE 650 can successfully transmit data to a base station (gNB) 640 by using the uplink 630 of 1.8 GHz. In addition, although a first UE 645 has nothing to do with the service area problem, it can select and use one of 1.8 GHz and 3.5 GHz for the purpose of distributing uplink access congestion because of being able to use both 1.8 GHz uplink and 3.5 GHz uplink. The additional uplink frequency may be an LTE frequency.

Both the NR uplink frequency and the SUL frequency may be configured for one UE, and in this case, the PUSCH, which is an uplink data channel, may be transmitted in only one uplink at a time. The PUCCH is also transmitted in only one uplink at a time and may be transmitted in the same uplink as or different uplink from that of the PUSCH.

Figure 7:
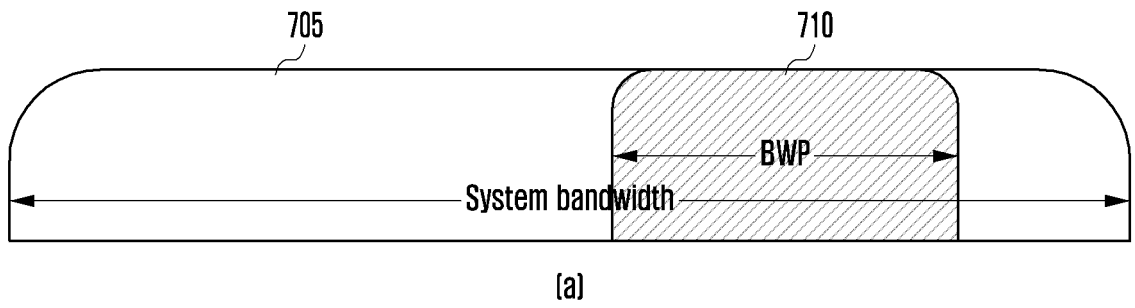
FIG. 7 is a diagram illustrating a scenario of applying a bandwidth part in a next-generation mobile communication system according to an embodiment of the disclosure.
Figure 7:
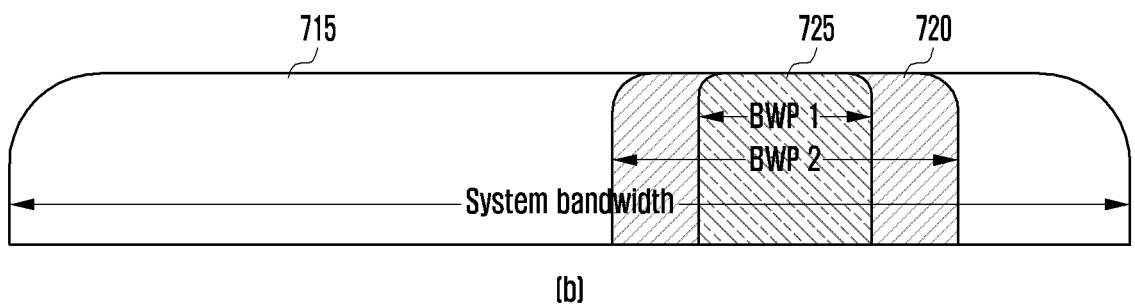
Figure 7:
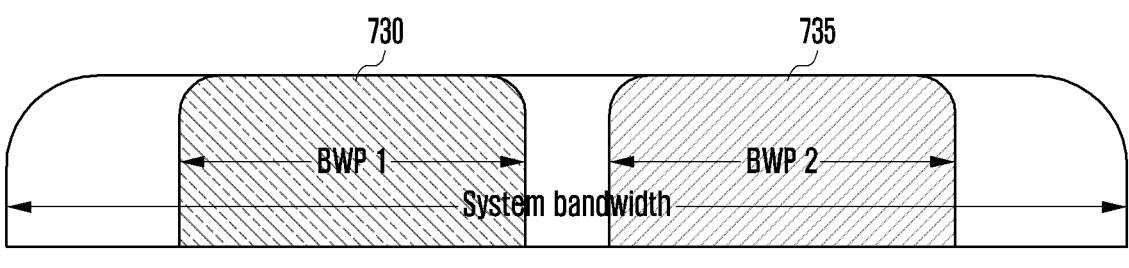

FIG. 7 is a diagram illustrating a scenario of applying a bandwidth part in a next-generation mobile communication system according to an embodiment of the disclosure.

The bandwidth part (BWP) technology means that one UE performs communication using only a partial frequency bandwidth in the entire system frequency bandwidth used by one cell. The BWP may be used for a UE manufacturing cost reduction or UE power saving purpose. The BWP may be configured by a base station only for UEs supporting it.

With reference to FIG. 7, there may be three major BWP operation scenarios.

The first scenario is to apply the BWP for a UE supporting only a frequency bandwidth 710 that is narrower than a system frequency bandwidth 705 used by one cell. In order to reduce manufacturing cost, a specific UE may be developed to support a limited frequency bandwidth. This UE should report to the base station that only the limited frequency bandwidth is supported, and accordingly the base station may configure the BWP of the maximum bandwidth or less supported by the UE.

The second scenario is to apply the BWP for the purpose of UE power saving. For example, when one UE performs communication using the entire system frequency bandwidth 715 used by one cell or its partial frequency bandwidth 720, the communication base station may configure a narrower frequency bandwidth 725 for the purpose of power saving.

The third scenario is to apply individual BWPs corresponding to different numerologies. The numerology refers to diversifying a physical layer configuration in order to implement optimal data transmission in accordance with various service requirements. For example, in an OFDMA structure composed of a plurality of subcarriers, the spacing between the subcarriers may be variably adjusted according to a predetermined requirement. One UE can communicate by applying a plurality of numerologies at the same time. In this case, since the physical layer configurations corresponding to respective numerologies are different, it is preferable to apply each numerology by separating individual BWPs 735 and 740.

The disclosure proposes an EDT operation in consideration of major features in the next-generation mobile communication system. In particular, it is characterized in that a normal uplink (NUL) or a supplementary uplink (SUL) is determined according to a predetermined condition by reflecting the influence of SUL, BWP, etc. and the random access is performed by applying the uplink. In case that the SUL is determined, a specific BWP is used in the random access procedure.

In the first embodiment, mobile originated (MO) CP EDT considering the SUL is described.

In the second embodiment, mobile originated (MO) UP EDT considering the SUL is described.

In the third embodiment, mobile terminated (MT) CP EDT considering the SUL is described.

In the fourth embodiment, mobile terminated (MT) UP EDT considering the SUL is described.

First Embodiment

Figure 8:
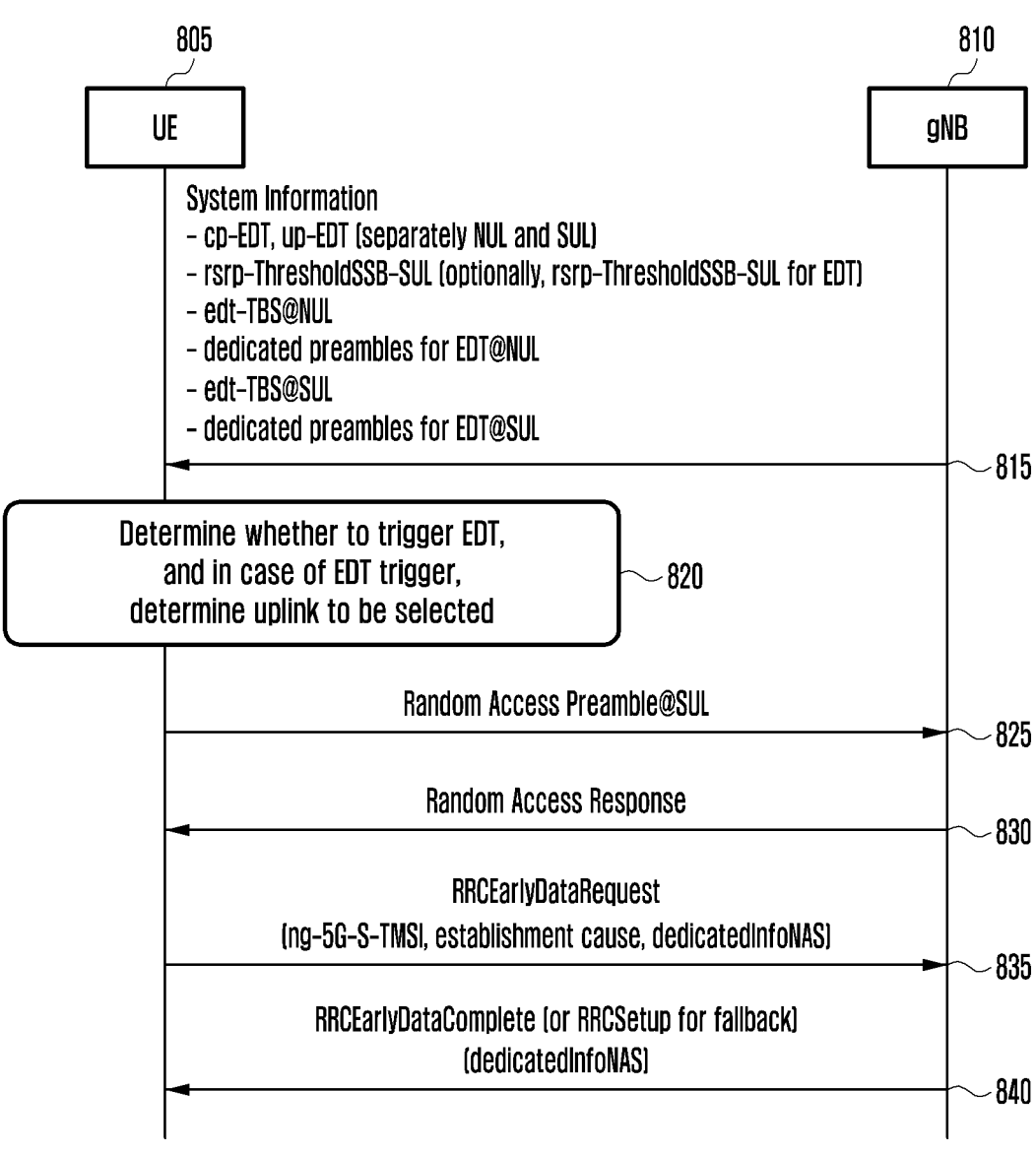
FIG. 8 is a diagram illustrating an operation sequence of a UE and a gNB for performing an EDT operation in the first embodiment of the disclosure.

FIG. 8 is a diagram illustrating an operation sequence of a UE and a gNB for performing an EDT operation in the first embodiment of the disclosure.

In the first embodiment, a process in which a UE 805 uses the CP EDT in case of needing to transmit data of a small size through the uplink will be described. In this case, the network may support the MO EDT through the SUL. The CP EDT may be performed when the UE is in the idle mode (RRC_IDLE).

A base station (gNB) 810 may broadcast related configuration information as follows to support the MO EDT in a normal uplink (NUL) and the SUL through system information (step 815).

A separate indicator indicating whether the corresponding cell supports the CP EDT and the UP EDT for each of the NUL and the SUL. For example, a cp-EDT field and an up-EDT field indicating whether the CP EDT and the UP EDT are supported in the NUL, and a cp-EDTforSUL field and an up-EDTforSUL field indicating whether the CP EDT and the UP EDT are supported in the SUL may be defined. Alternatively, a cp-EDT field and an up-EDT field applied to both the NUL and the SUL may be defined.

An rsrp-ThresholdSSB-SUL threshold for determining whether or not to apply the SUL. When a measured downlink reference signal received power (RSRP) value is lower than the threshold, the SUL may be selected to perform the random access operation. Otherwise, the NUL may be selected. For the EDT, a separate rsrp-ThresholdSSB-SULforEDT may be defined. When transmitting small-sized data through the EDT operation, the UE may select the NUL or the SUL by applying ThresholdSSB-SULforEDT instead of the rsrp-ThresholdSSB-SUL.

An edt-TBS field, the upper limit value of a data size (e.g., MAC PDU size) that can be transmitted through the EDT operation. Because the data size may be different for the NUL and the SUL, an edt-TBS field and an edt-TBSforSUL field may be defined for the NUL and the SUL, respectively.

EDT-dedicated random access preamble information. It may be provided for each of the NUL and the SUL.

BWP information for performing a random access procedure for the EDT in the NUL and the SUL. Although the disclosure proposes an initial BWP as a BWP for performing the random access procedure for the EDT, a separate BWP for performing the random access procedure for the EDT may be configured for flexibility. If the separate BWP is configured, this BWP is used, otherwise, if not configured, the initial BWP may be used.

MT-EDT related configuration information, preambleInitialReceivedTargetPowerEDT, messagePowerOffsetEDT, otherOffset, etc. (can be used in options 1-4 below.)

Depending on the state of the channel quality, the amount of data that can be transmitted through the same transmission power may vary. Therefore, even in the EDT, the size of an edt-transport block size (edt-TBS) may vary depending on the state of the channel quality experienced by the UE. To support this, a plurality of edt-TBSs (or edt-TBSforSULs) and a corresponding plurality of rsrp-ThresholdSSB-SULs (reference signal received power—threshold synchronization signal block—supplementary uplink or rsrp-ThresholdSSB-SULforEDT) may be configured.

The UE receiving the EDT configuration information may generate data of a small size to be transmitted. In this case, the UE may determine whether to transmit the data through the EDT in accordance with a predetermined rule, and if the data will be transmitted through the EDT, it may determine which uplink of the NUL and the SUL will be used (step 820). The RRC layer of the UE receiving the system information containing the EDT configuration information primarily determines whether to trigger the MO-EDT, and requests this to the MAC layer. The MAC layer may determine the NUL or the SUL for the EDT operation, determine again whether data transmission is actually possible through the EDT, and notify it to the RRC layer. For example, the RRC layer primarily determines whether EDT transmission is possible using the edt-TBS information contained in the received system information, but the amount of data to be transmitted may exceed the edt-TBS due to addition of MAC CE, etc. when the MAC layer actually configures the MAC PDU. In this case, the MAC layer may notify the RRC layer that the requested EDT cannot be performed.

The RRC layer of the UE may request a MO-EDT trigger from the lower MAC layer when at least the following conditions are satisfied.

In case of the CP-EDT, when the NAS of the UE requests the RRC establishment, when the UE itself supports the CP-EDT in at least one uplink (the NUL or the SUL), and when the received system information contains an indicator indicating that the CP-EDT is supported in at least one uplink (the NUL or the SUL)

In case of the UP-EDT, when the NAS of the UE requests the RRC resume, when the UE itself supports the UP-EDT in at least one uplink (the NUL or the SUL), and when the received system information contains an indicator indicating that the UP-EDT is supported in at least one uplink (the NUL or the SUL)

When an establishment cause value of the triggered access is mo-data

When an access identity mapped to the triggered access is access identity 0 (general service), and when an access category is access category 1 (delay tolerant service) or access category 7 (mobile originated data, MO data)

When configuration information necessary to perform the EDT operation is provided from the base station When the expected amount of uplink data to be transmitted is less than or equal to the TBS indicated by at least one edt-TBS corresponding to the uplink(s) supported by the UE provided in the system information When an EDT fallback indicator is not received from the lower layer (The fallback indicator refers to, although the RRC layer requests the EDT from the lower MAC layer, an indicator reported to the RRC layer by the lower layer determining that a condition for performing the EDT is not satisfied.)

If the UE does not support the SUL, the RRC layer does not consider the SUL when evaluating the above conditions. Even if the UE supports the SUL, the MAC layer, not the RRC layer, may finally decide whether to use this in the EDT operation.

The MAC layer receiving a request for triggering the EDT operation may, in consideration of one or combination of several options below, finally determine whether to perform the EDT and determine the NUL or the SUL to perform the EDT.

Option 1-1: If both the UE and the base station support the SUL and the EDT operation in the SUL, if the RSRP value of the measured downlink pathloss reference signal is smaller than the rsrp-ThresholdSSB-SUL (or rsrp-ThresholdSSB-SULforEDT), and if the amount of uplink data (MAC PDU) to be transmitted does not exceed the edt-TBSforSUL corresponding to the SUL, the random access for the EDT may be triggered in the SUL.

Otherwise, if both the UE and the base station support the NUL and the EDT operation in the NUL, if the RSRP value of the measured downlink pathloss reference signal is greater than or equal to the rsrp-ThresholdSSB-SUL (or rsrp-ThresholdSSB-SULforEDT), and if the amount of uplink data (MAC PDU) to be transmitted does not exceed the edt-TBS corresponding to the NUL, the random access for the EDT may be triggered in the NUL.

Otherwise, if both the UE and the base station support the SUL and the EDT operation in the SUL, if the RSRP value of the measured downlink pathloss reference signal is greater than or equal to the rsrp-ThresholdSSB-SUL (or rsrp-ThresholdSSB-SULforEDT), and if the amount of uplink data (MAC PDU) to be transmitted exceeds the edt-TBS corresponding to the NUL and does not exceed the edt-TBSforSUL corresponding to the SUL, the random access for the EDT may be triggered in the SUL. In this case, even if the RSRP value of the measured downlink pathloss reference signal is greater than or equal to the rsrp-ThresholdSSB-SUL (or rsrp-ThresholdSSB-SULforEDT), the EDT operation in the SUL may be supported.

Otherwise, if the RSRP value of the measured downlink pathloss reference signal is smaller than the rsrp-ThresholdSSB-SUL, the random access for the RRC establishment may be triggered in the SUL. Otherwise, the random access for the RRC establishment may be triggered in the NUL.

Option 1-2: If the RSRP value of the measured downlink pathloss reference signal is smaller than the rsrp-ThresholdSSB-SUL (or rsrp-ThresholdSSB-SULforEDT), and if the amount of uplink data (MAC PDU) to be transmitted does not exceed the edt-TBSforSUL corresponding to the SUL, the random access for the EDT may be triggered in the SUL. Otherwise, if the RSRP value of the measured downlink pathloss reference signal is smaller than the rsrp-ThresholdSSB-SUL (or rsrp-ThresholdSSB-SULforEDT), and if the amount of uplink data (MAC PDU) to be transmitted exceeds the edt-TBSforSUL corresponding to the SUL, the random access for the RRC establishment may be triggered in the SUL.

If the RSRP value of the measured downlink pathloss reference signal is greater than or equal to the rsrp-ThresholdSSB-SUL (or rsrp-ThresholdSSB-SULforEDT), and if the amount of uplink data (MAC PDU) to be transmitted does not exceed the edt-TBS corresponding to the NUL, the random access for the EDT may be triggered in the NUL. Otherwise, if the RSRP value of the measured downlink pathloss reference signal is greater than or equal to the rsrp-ThresholdSSB-SUL (or rsrp-ThresholdSSB-SULforEDT), and if the amount of uplink data (MAC PDU) to be transmitted exceeds the edt-TBS corresponding to the NUL, the random access for the RRC establishment may be triggered in the NUL.

Option 1-3: The edt-TBS may be commonly applied to the NUL and the SUL. The EDT-dedicated random access preamble may be separately configured in each of the NUL and the SUL. The network may configure the EDT-dedicated random access preamble for the NUL, the SUL, or both.

If the edt-TBS and the EDT-dedicated random access preamble for the SUL are configured, if the RSRP value of the measured downlink pathloss reference signal is smaller than the rsrp-ThresholdSSB-SUL (or rsrp-ThresholdSSB-SULforEDT), and if the amount of uplink data (MAC PDU) to be transmitted does not exceed the edt-TBSforSUL corresponding to the SUL, the random access for the EDT may be triggered in the SUL.

If the edt-TBS and the EDT-dedicated random access preamble for the NUL are configured, if the RSRP value of the measured downlink pathloss reference signal is greater than or equal to the rsrp-ThresholdSSB-SUL (or rsrp-ThresholdSSB-SULforEDT), and if the amount of uplink data (MAC PDU) to be transmitted does not exceed the edt-TBS corresponding to the NUL, the random access for the EDT may be triggered in the NUL.

Otherwise, a general RRC establishment operation may be triggered.

Option 1-4: If both the UE and the base station support the SUL and the EDT operation in the SUL, and if the RSRP value of the measured downlink pathloss reference signal is smaller than the rsrp-ThresholdSSB-SUL (or rsrp-ThresholdSSB-SULforEDT), the SUL may be selected. If the amount of uplink data (MAC PDU) (or the size of msg33) to be transmitted does not exceed the edt-TBS and satisfies the following condition, $$RSRP \text{ of DL pathloss reference signal} < PCMAX - preambleInitialReceivedTargetPowerEDT - messagePowerOffsetEDT(-otherOffset)$$

the EDT may be triggered in the SUL. Otherwise, the random access for the RRC establishment may be triggered in the SUL.

The preambleInitialReceivedTargetPowerEDT is initial random access preamble transmission power in the random access procedure for the EDT, the messagePowerOffsetEDT is a transmission power offset value in consideration of the amount of data to be transmitted (if a plurality of edt-TBSs are provided, this value may also exist in plural), and the otherOffset is any other offset value.

If both the UE and the base station support the NUL and the EDT operation in the NUL, and if the RSRP value of the measured downlink pathloss reference signal is greater than or equal to the rsrp-ThresholdSSB-SUL (or rsrp-Threshold-SSB-SULforEDT), the NUL may be selected. If the amount of uplink data (MAC PDU) (or the size of msg33) to be transmitted does not exceed the edt-TBS and satisfies the following condition, $$RSRP \text{ of DL pathloss reference signal} < PCMAX - preambleInitialReceivedTargetPowerEDT - messagePowerOffsetEDT(-otherOffset)$$

the EDT may be triggered in the NUL. Otherwise, the random access for the RRC establishment may be triggered in the NUL.

The base station may configure preambleInitialReceived-TargetPowerEDT, messagePowerOffsetEDT, and otherOffset in the system information, and provide these parameters for each of the NUL and the SUL.

Option 1-5: If both the UE and the base station support the SUL and the EDT operation in the SUL, and if the RSRP value of the measured downlink pathloss reference signal is smaller than the rsrp-ThresholdSSB-SUL (or rsrp-Thresh-oldSSB-SULforEDT), the SUL may be selected. If the amount of uplink data (MAC PDU) to be transmitted does not exceed the edt-TBSforSUL corresponding to the SUL, the random access for the EDT may be triggered in the SUL. Otherwise, the random access for the RRC establishment may be triggered in the SUL.

If both the UE and the base station support the NUL and the EDT operation in the NUL, and if the RSRP value of the measured downlink pathloss reference signal is greater than or equal to the rsrp-ThresholdSSB-SUL (or rsrp-Threshold-SSB-SULforEDT), the NUL may be selected. If the amount of uplink data (MAC PDU) to be transmitted does not exceed the edt-TBS corresponding to the NUL, the random access for the EDT may be triggered in the NUL. Otherwise, the random access for the RRC establishment may be triggered in the NUL.

Even if the RSRP value of the measured downlink path-loss reference signal is greater than or equal to the rsrp-ThresholdSSB-SUL (or rsrp-ThresholdSSB-SULforEDT), the network may configure using an indicator (or configuration information) provided as the system information to trigger the EDT in the SUL. In this case, when the UE satisfies the above conditions, but cannot trigger the EDT in the NUL due to reasons such as the amount of uplink data (MAC PDU) to be transmitted exceeds the edt-TBS corresponding to the NUL, the EDT operation can be triggered in the SUL. However, the random access for the EDT can be triggered in the SUL only when the amount of uplink data (MAC PDU) to be transmitted does not exceed the edt-TBSforSUL corresponding to the SUL even in the SUL, the random access for the EDT may be triggered in the SUL. If the condition for triggering the EDT is not met even in the SUL, the UE may trigger the random access for the RRC establishment in the NUL.

Option 1-6: The base station supporting the EDT operation in the NUL and the SUL may provide the UE with a plurality of RSRP thresholds and a corresponding group of a plurality of edt-TBS information and EDT-dedicated random access preambles. The edt-TBS information and EDT-dedicated random access preamble group corresponding to the RSRP thresholds may be provided for each of the NUL and the SUL.

The UE supporting the EDT operation in the NUL and the SUL may compare the measured RSRP value of a serving cell (the RSRP value of the measured downlink pathloss reference signal) with the plurality of RSRP thresholds, and compare the amount of uplink data to be transmitted with the edt-TBS value corresponding to the largest threshold among the RSRP thresholds that are smaller than or equal to the measured RSRP value. If the amount of uplink data to be transmitted does not exceed the edt-TBS, the random access for the EDT may be triggered. In the random access, one of the EDT preamble(s) corresponding to the selected threshold may be transmitted to the base station.

In the above options, any combination of operations complementary to each other are also possible.

The UE may transmit an EDT-dedicated random access preamble to the base station in the initial BWP or the configured BWP (if configured by the base station) of the selected uplink (step 825). If deciding to perform the EDT in the SUL, the UE may transmit the EDT-dedicated random access preamble allocated to the SUL to the base station. The base station receiving the preamble may determine that the UE has requested the EDT. The base station may transmit a random access response message (RAR message) to the UE (step 830). The RAR may contain scheduling information for the msg3. Although the UE has transmitted the preamble in the SUL, the base station may want to perform the remaining random access operation in the NUL instead of the SUL. For example, when evaluating the received signal strength of the preamble transmitted by the UE, in case where there is no difficulty in performing the remaining random access operation in the NUL, or in case where it is more preferable to perform the remaining random access operation in the NUL in terms of uplink load balancing, the base station may want to perform the remaining random access operation in the NUL instead of the SUL. That is, the base station may want to change the uplink. To this end, the base station may include an indicator indicating the uplink change in the DCI corresponding to the RA-RNTI or include an indicator indicating the uplink change in the UL grant or new field in the RAR. If there is no indicator, the UE may transmit the msg3 in the uplink in which the preamble was transmitted. It is also possible to change from the NUL to the SUL. The UE may include a certain RRC message (tentatively called RRCEarlyDataRequest message) in the msg3 and transmit it to the base station (step 835). This message may include ng-5G-S-TMSI, which is the ID of the UE, establishment cause information, and a NAS container storing data to be transmitted. Upon receiving the msg3, the base station may transmit the msg4 including a certain RRC message (tentatively called RRCEarlyDataComplete message) for the purpose of ACK to the UE (step 840). For the data contained in the msg3, there may be response data at the application level. Accordingly, in order to transmit the response data to the UE, the NAS container containing it may be included in the msg4. In addition, the network may determine that it may be necessary to transmit/receive additional data that is difficult to deliver in the random access procedure. In this case, because it is desirable to switch the UE to the connected mode, the base station may transmit an RRCSetup message in the msg4 instead of the RRCearlyDataComplete message upon determining that it is necessary to switch the UE to the connected mode. The RRC message includes information necessary for the UE to switch to the connected mode. If the received RRCSetup message is a response message of the transmitted RRCEarlyDataRequest message, the UE does not include the ng-5G-S-TMSI-Value field in the RRCSetupComplete message to be transmitted to the base station. Because the ng-5G-S-TMSI information is transmitted to the base station in the RRCEarlyDataRequest message, there is no need to transmit the ng-5G-S-TMSI or ng-5G-S-TMSI-Part2.

Second Embodiment

Figure 9:
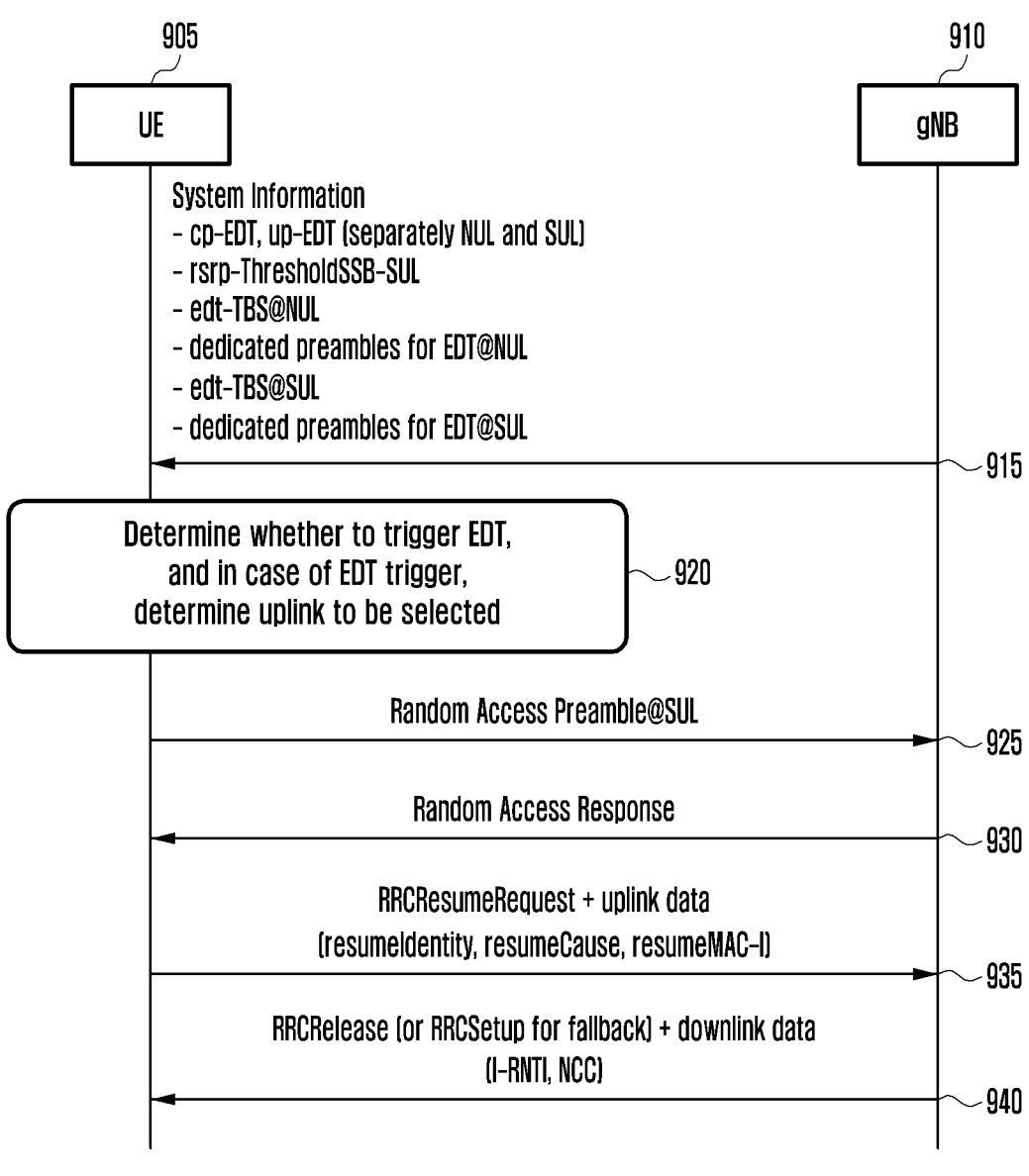
FIG. 9 is a diagram illustrating an operation sequence of a UE and a gNB for performing an EDT operation in the second embodiment of the disclosure.

FIG. 9 is a diagram illustrating an operation sequence of a UE and a gNB for performing an EDT operation in the second embodiment of the disclosure.

In the second embodiment, a process in which a UE 905 uses the UP EDT in case of needing to transmit data of a small size through the uplink will be described. In this case, the network may support the MO EDT through the SUL. The UP EDT may be performed when the UE is in the inactive mode (RRC_INACTIVE).

A base station (gNB) 910 may broadcast related configuration information as follows to support the MO EDT in the NUL and the SUL through system information (step 915).

A separate indicator indicating whether the corresponding cell supports the CP EDT and the UP EDT for each of the NUL and the SUL. For example, a cp-EDT field and an up-EDT field indicating whether the CP EDT and the UP EDT are supported in the NUL, and a cp-EDTforSUL field and an up-EDTforSUL field indicating whether the CP EDT and the UP EDT are supported in the SUL may be defined. Alternatively, a cp-EDT field and an up-EDT field applied to both the NUL and the SUL may be defined.

An rsrp-ThresholdSSB-SUL threshold for determining whether or not to apply the SUL. When a measured downlink reference signal received power (RSRP) value is lower than the threshold, the SUL may be selected to perform the random access operation. Otherwise, the NUL may be selected. For the EDT, a separate rsrp-ThresholdSSB-SULforEDT may be defined. When transmitting small-sized data through the EDT operation, the UE may select the NUL or the SUL by applying ThresholdSSB-SULforEDT instead of the rsrp-ThresholdSSB-SUL.

An edt-TBS field, the upper limit value of a data size (e.g., MAC PDU size) that can be transmitted through the EDT operation. Because the data size may be different for the NUL and the SUL, an edt-TBS field and an edt-TBSforSUL field may be defined for the NUL and the SUL, respectively.

EDT-dedicated random access preamble information. It may be provided for each of the NUL and the SUL.

BWP information for performing a random access procedure for the EDT in the NUL and the SUL. Although the disclosure proposes an initial BWP as a BWP for performing the random access procedure for the EDT, a separate BWP for performing the random access procedure for the EDT may be configured for flexibility. If the separate BWP is configured, this BWP is used, otherwise, if not configured, the initial BWP may be used.

MT-EDT related configuration information, preambleInitialReceivedTargetPowerEDT, messagePowerOffsetEDT, otherOffset, etc.

Depending on the state of the channel quality, the amount of data that can be transmitted through the same transmission power may vary. Therefore, even in the EDT, the size of an edt-transport block size (edt-TBS) may vary depending on the state of the channel quality experienced by the UE. To support this, a plurality of edt-TBSs (or edt-TBSforSULs) and a corresponding plurality of rsrp-ThresholdSSB-SULs (or rsrp-ThresholdSSB-SULforEDT) may be configured.

The UE receiving the EDT configuration information may generate data of a small size to be transmitted. In this case, the UE may determine whether to transmit the data through the EDT in accordance with a predetermined rule, and if the data will be transmitted through the EDT, it may determine which uplink of the NUL and the SUL will be used (step 920). The RRC layer of the UE receiving the system information containing the EDT configuration information primarily determines whether to trigger the EDT, and requests this to the MAC layer. The MAC layer may determine the NUL or the SUL for the EDT operation, determine again whether data transmission is actually possible through the EDT, and notify it to the RRC layer. For example, the RRC layer primarily determines whether EDT transmission is possible using the edt-TBS information contained in the received system information, but the amount of data to be transmitted may exceed the edt-TBS due to addition of MAC CE, etc. when the MAC layer actually configures the MAC PDU. In this case, the MAC layer may notify the RRC layer that the requested EDT cannot be performed.

The RRC layer of the UE may request a MO-EDT trigger from the lower MAC layer when at least the following conditions are satisfied.

In case of the CP-EDT, when the NAS of the UE requests the RRC establishment, when the UE itself supports the CP-EDT in at least one uplink (the NUL or the SUL), and when the received system information contains an indicator indicating that the CP-EDT is supported in at least one uplink (the NUL or the SUL)

In case of the UP-EDT, when the NAS of the UE requests the RRC resume, when the UE itself supports the UP-EDT in at least one uplink (the NUL or the SUL), and when the received system information contains an indicator indicating that the UP-EDT is supported in at least one uplink (the NUL or the SUL)

When an establishment cause value of the triggered access is mo-data

When an access identity mapped to the triggered access is access identity 0 (general service), and when an access category is access category 1 (delay tolerant service) or access category 7 (mobile originated data, MO data)

When configuration information necessary to perform the EDT operation is provided from the base station When the expected amount of uplink data to be transmitted is less than or equal to the TBS indicated by at least one edt-TBS corresponding to the uplink(s) supported by the UE provided in the system information When an EDT fallback indicator is not received from the lower layer (The fallback indicator refers to, although the RRC layer requests the EDT from the lower MAC layer, an indicator reported to the RRC layer by the lower layer determining that a condition for performing the EDT is not satisfied.)

If the UE does not support the SUL, the RRC layer does not consider the SUL when evaluating the above conditions. Even if the UE supports the SUL, the MAC layer, not the RRC layer, may finally decide whether to use this in the EDT operation.

The MAC layer receiving a request for triggering the EDT operation may, in consideration of one or combination of options proposed above in the first embodiment, finally determine whether to perform the EDT and determine the NUL or the SUL to perform the EDT.

The UE may transmit an EDT-dedicated random access preamble to the base station in the initial BWP or the configured BWP (if configured by the base station) of the selected uplink (step 925). If deciding to perform the EDT in the SUL, the UE may transmit the EDT-dedicated random access preamble allocated to the SUL to the base station. The base station receiving the preamble may determine that the UE has requested the EDT. The base station may transmit a random access response message (RAR message) to the UE (step 930). The RAR message may contain scheduling information for the msg3. Although the UE has transmitted the preamble in the SUL, the base station may want to perform the remaining random access operation in the NUL instead of the SUL. For example, when evaluating the received signal strength of the preamble transmitted by the UE, in case where there is no difficulty in performing the remaining random access operation in the NUL, or in case where it is more preferable to perform the remaining random access operation in the NUL in terms of uplink load balancing, the base station may want to perform the remaining random access operation in the NUL instead of the SUL. That is, the base station may want to change the uplink. To this end, the base station may include an indicator indicating the uplink change in the DCI corresponding to the RA-RNTI or include an indicator indicating the uplink change in the UL grant or new field in the RAR. If there is no indicator, the UE may transmit the msg3 in the uplink in which the preamble was transmitted. It is also possible to change from the NUL to the SUL. The UE may include a certain RRC message, RRCResumeRequest message, in the msg3 and transmit it to the base station (step 935). This message may include resumeIdentity, which is the ID of the UE, resume cause information, and resumeMAC-I. The resumeIdentity is UE ID information required for one base station to obtain a UE context from other base station having the UE context. The resumeMAC-I is token information for UE authentication in the base station. When switching from the connected mode to the inactive mode, the UE may receive an RRCRelease message containing SuspendConfig IE from the base station. The SuspendConfig IE may contain both fullI-RNTI (40 bits) and shortI-RNTI (24 bits) that can be used as the resumeIdentity. The base station indicates, through the system information, an ID to be used as the resumeIdentity to be contained in an RRCResumeRequest message of the UE, that is, either fullI-RNTI or shortI-RNTI. Alternatively, in the EDT operation, shortI-RNTI may always be used to optimize the size of the msg3. DTCH including data to be transmitted may be multiplexed with the RRC message to configure the msg3. Upon receiving the msg3, the base station may transmit the msg4 including a certain RRC message, an RRCRelease message, to the UE in order to switch the UE back to the inactive mode together with the ACK purpose (step 940). In this case, the SuspendConfig IE may be contained in the RRCRelease message. For the data contained in the msg3, there may be response data at the application level. Therefore, in order to transmit the response data to the UE, the DTCH containing this may be multiplexed in the msg4. In addition, the network may determine that it may be necessary to transmit/receive additional data that is difficult to deliver in the random access procedure. In this case, because it is desirable to switch the UE to the connected mode, the base station may transmit an RRCSetup message in the msg4 instead of the RRCRelease message upon determining that it is necessary to switch the UE to the connected mode. The RRC message includes information necessary for the UE to switch to the connected mode.

Third Embodiment

Figure 10:
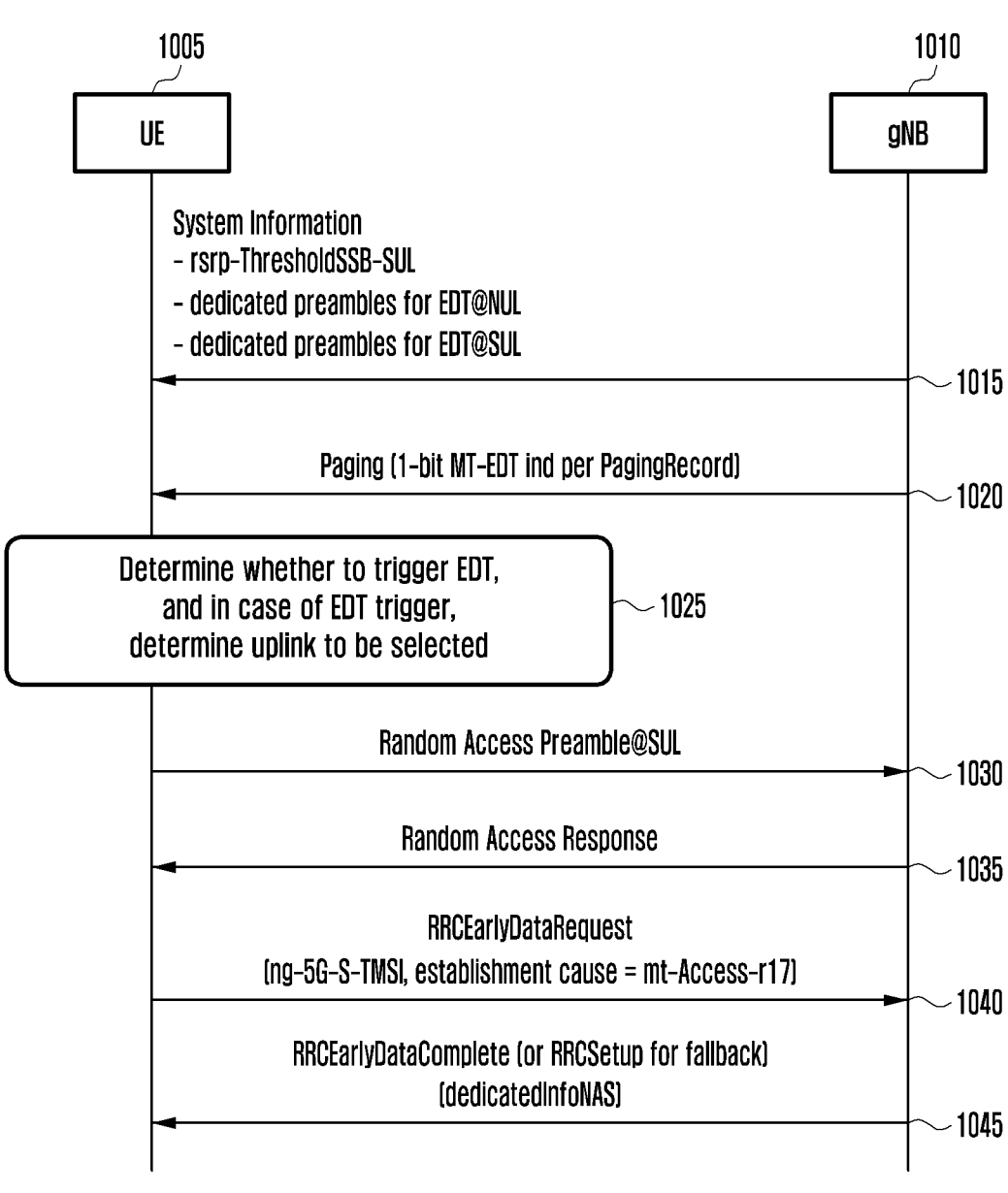
FIG. 10 is a diagram illustrating an operation sequence of a UE and a gNB for performing an EDT operation in the third embodiment of the disclosure.

FIG. 10 is a diagram illustrating an operation sequence of a UE and a gNB for performing an EDT operation in the third embodiment of the disclosure.

In the third embodiment, a process in which a UE 1005 uses the CP EDT in case of needing to transmit data of a small size through the downlink will be described. In this case, the network may support the MT EDT through the SUL. The CP EDT may be performed when the UE is in the idle mode (RRC_IDLE).

A base station (gNB) 1010 may broadcast related configuration information as follows to support the MT EDT in the NUL and the SUL through system information (step 1015).

An rsrp-ThresholdSSB-SUL threshold for determining whether or not to apply the SUL. If a measured downlink RSRP value is lower than the threshold, the SUL may be selected to perform the random access operation. Otherwise, the NUL may be selected. For the EDT, a separate rsrp-ThresholdSSB-SULforEDT may be defined. When transmitting small-sized data through the EDT operation, the UE may select the NUL or the SUL by applying ThresholdSSB-SULforEDT instead of the rsrp-ThresholdSSB-SUL.

EDT-dedicated random access preamble information. It may be provided for each of the NUL and the SUL.

BWP information for performing a random access procedure for the EDT in the NUL and the SUL. Although the disclosure proposes an initial BWP as a BWP for performing the random access procedure for the EDT, a separate BWP for performing the random access procedure for the EDT may be configured for flexibility. If the separate BWP is configured, this BWP is used, otherwise, if not configured, the initial BWP may be used.

MT-EDT related configuration information, preambleInitialReceivedTargetPowerEDT, messagePowerOffsetEDT, otherOffset, etc.

The base station may generate data of a small size to be transmitted to the UE receiving the EDT configuration information. In this case, the base station may determine whether to transmit the data through the EDT in accordance with a predetermined rule, and if the data will be transmitted through the EDT, the base station may transmit a paging message to the UE (step 1020). In this case, the paging message may include an indicator indicating an MT-EDT trigger in the PagingRecord IE containing the ID of the UE. Upon receiving the paging message containing the indicator, the UE may determine which uplink will be used for the MT-EDT operation (step 1025). The RRC layer of the UE may request an MT-EDT trigger from the lower MAC layer when at least the following conditions are satisfied.

In case of the CP-EDT, when the UE itself supports the CP-EDT in at least one uplink (the NUL or the SUL)

In case of the UP-EDT, when the UE itself supports the UP-EDT in at least one uplink (the NUL or the SUL)

When an establishment cause value of the triggered access is mt-access

When an access identity mapped to the triggered access is access identity 0 (general service), and when an access category is access category 0

When configuration information necessary to perform the EDT operation is provided from the base station When an EDT fallback indicator is not received from the lower layer (The fallback indicator refers to, although the RRC layer requests the EDT from the lower MAC layer, an indicator reported to the RRC layer by the lower layer determining that a condition for performing the EDT is not satisfied.)

If the UE does not support the SUL, the RRC layer does not consider the SUL when evaluating the above conditions. Even if the UE supports the SUL, the MAC layer, not the RRC layer, may finally decide whether to use this in the EDT operation. For example, the MAC layer of the UE may determine whether to trigger the MT-EDT by determining whether the following equation is satisfied.

$$RSRP \text{ of DL pathloss reference signal} < PCMAX - preambleInitialReceivedTargetPowerEDT - messagePowerOffsetEDT(-otherOffset)$$

Alternatively, unlike the MO-EDT, in the MT-EDT, the UE may immediately trigger the MT-EDT when receiving a paging message including the indicator without determining the MT-EDT trigger in the RRC layer and the MAC layer.

In consideration of one or combination of the following options, the UE may determine the NUL or the SUL to perform the MT-EDT.

Option 2-1: If both the UE and the base station support the SUL and the EDT operation in the SUL, and if the RSRP value of the measured downlink pathloss reference signal is smaller than the rsrp-ThresholdSSB-SUL (or rsrp-ThresholdSSB-SULforEDT), the random access for the EDT may be triggered in the SUL.

Otherwise, if both the UE and the base station support the NUL and the EDT operation in the NUL, and if the RSRP value of the measured downlink pathloss reference signal is greater than or equal to the rsrp-ThresholdSSB-SUL (or rsrp-ThresholdSSB-SULforEDT), the random access for the EDT may be triggered in the NUL.

Otherwise, if information indicating that the EDT is not supported in the SUL is received in the paging message, the random access for RRC establishment may be triggered in the SUL.

Otherwise, if information indicating that EDT is not supported in the NUL is received in the paging message, the random access for RRC establishment may be triggered in the NUL.

Option 2-2: If both the UE and the base station support the SUL, and if the RSRP value of the measured downlink pathloss reference signal is smaller than the rsrp-ThresholdSSB-SUL (or rsrp-ThresholdSSB-SULforEDT), the SUL may be selected. If the UE and the base station support the EDT operation in the SUL, the random access for the EDT may be triggered in the SUL. If the EDT operation is not supported, the random access for the RRC establishment may be triggered.

If the conditions for the SUL are not satisfied, if both the UE and the base station support the NUL, and if the RSRP value of the measured downlink pathloss reference signal is greater than or equal to the rsrp-ThresholdSSB-SUL (or rsrp-ThresholdSSB-SULforEDT), the NUL may be selected. If the UE and the base station support the EDT operation in the NUL, the random access for the EDT may be triggered in the NUL. If the EDT operation is not supported, the random access for the RRC establishment may be triggered.

The UE may transmit an EDT-dedicated random access preamble to the base station in the initial BWP or the configured BWP (if configured by the base station) of the selected uplink (step 1030). If deciding to perform the EDT in the SUL, the UE may transmit the EDT-dedicated random access preamble allocated to the SUL to the base station. The base station receiving the preamble may determine that the UE has requested the EDT. The base station may transmit a random access response message (RAR message) to the UE (step 1035). The RAR message may contain scheduling information for the msg3. Although the UE has transmitted the preamble in the SUL, the base station may want to perform the remaining random access operation in the NUL instead of the SUL. For example, when evaluating the received signal strength of the preamble transmitted by the UE, in case where there is no difficulty in performing the remaining random access operation in the NUL, or in case where it is more preferable to perform the remaining random access operation in the NUL in terms of uplink load balancing, the base station may want to perform the remaining random access operation in the NUL instead of the SUL. That is, the base station may want to change the uplink. To this end, the base station may include an indicator indicating the uplink change in the DCI corresponding to the RA-RNTI or include an indicator indicating the uplink change in the UL grant or new field in the RAR message. It is also possible to change from the NUL to the SUL. The UE may include a certain RRC message (tentatively called RRCEarlyDataRequest message) in the msg3 and transmit it to the base station (step 1040). This message may include ng-5G-S-TMSI (or ng-5G-S-TMSI-Part1), which is the ID of the UE, and establishment cause information. Upon receiving the msg3, the base station may transmit the msg4 including a certain RRC message (tentatively called RRCEarlyDataComplete message) to the UE (step 1045). In the msg4, a NAS container containing downlink data may be included. In addition, the network may determine that it may be necessary to transmit/receive additional data that is difficult to deliver in the EDT random access procedure. In this case, because it is desirable to switch the UE to the connected mode, the base station may transmit an RRCSetup message in the msg4 instead of the RRCearlyDataComplete message upon determining that it is necessary to switch the UE to the connected mode. The RRC message includes information necessary for the UE to switch to the connected mode.

Fourth Embodiment

Figure 11:
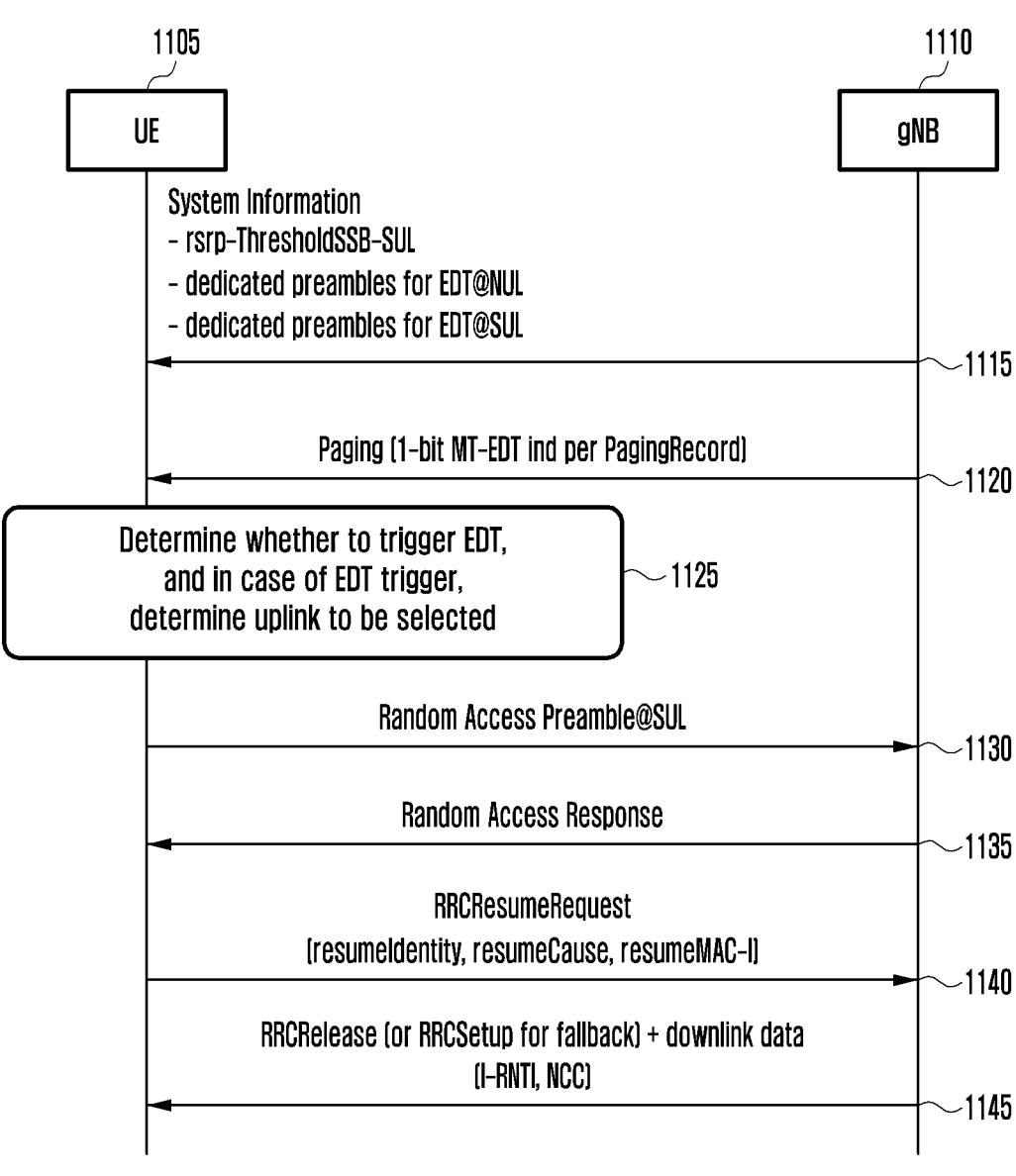
FIG. 11 is a diagram illustrating an operation sequence of a UE and a gNB for performing an EDT operation in the fourth embodiment of the disclosure.

FIG. 11 is a diagram illustrating an operation sequence of a UE and a gNB for performing an EDT operation in the fourth embodiment of the disclosure.

In the fourth embodiment, a process in which a UE 1105 uses the UP EDT in case of needing to transmit data of a small size through the downlink will be described. In this case, the network may support the MT EDT through the SUL. The UP EDT may be performed when the UE is in the inactive mode (RRC_INACTIVE).

A base station (gNB) 1110 may broadcast related configuration information as follows to support the MT EDT in the NUL and the SUL through system information (step 1115).

An rsrp-ThresholdSSB-SUL threshold for determining whether or not to apply the SUL. When a measured downlink RSRP value is lower than the threshold, the SUL may be selected to perform the random access operation. Otherwise, the NUL may be selected. For the EDT, a separate rsrp-ThresholdSSB-SULforEDT may be defined. When transmitting small-sized data through the EDT operation, the UE may select the NUL or the SUL by applying ThresholdSSB-SULforEDT instead of the rsrp-ThresholdSSB-SUL.

EDT-dedicated random access preamble information. It may be provided for each of the NUL and the SUL.

BWP information for performing a random access procedure for the EDT in the NUL and the SUL. Although the disclosure proposes an initial BWP as a BWP for performing the random access procedure for the EDT, a separate BWP for performing the random access procedure for the EDT may be configured for flexibility. If the separate BWP is configured, this BWP is used, otherwise, if not configured, the initial BWP may be used.

MT-EDT related configuration information, preambleInitialReceivedTargetPowerEDT, messagePowerOffsetEDT, otherOffset, etc.

The base station may generate data of a small size to be transmitted to the UE receiving the EDT configuration information. In this case, the base station may determine whether to transmit the data through the EDT in accordance with a predetermined rule, and if the data will be transmitted through the EDT, the base station may transmit a paging message to the UE (step 1120). In this case, the paging message may include an indicator indicating an MT-EDT trigger in the PagingRecord IE containing the ID of the UE. Upon receiving the paging message containing the indicator, the UE may determine which uplink will be used for the MT-EDT operation (step 1125). The RRC layer of the UE may request an MT-EDT trigger from the lower MAC layer when at least the following conditions are satisfied.

In case of the CP-EDT, when the UE itself supports the CP-EDT in at least one uplink (the NUL or the SUL)

In case of the UP-EDT, when the UE itself supports the UP-EDT in at least one uplink (the NUL or the SUL)

When an establishment cause value of the triggered access is mt-access

When an access identity mapped to the triggered access is access identity 0 (general service), and when an access category is access category 0

When configuration information necessary to perform the EDT operation is provided from the base station When an EDT fallback indicator is not received from the lower layer (The fallback indicator refers to, although the RRC layer requests the EDT from the lower MAC layer, an indicator reported to the RRC layer by the lower layer determining that a condition for performing the EDT is not satisfied.)

If the UE does not support the SUL, the RRC layer does not consider the SUL when evaluating the above conditions. Even if the UE supports the SUL, the MAC layer, not the RRC layer, may finally decide whether to use this in the EDT operation. For example, the MAC layer of the UE may determine whether to trigger the MT-EDT by determining whether the following equation is satisfied.

$$\text{RSRP of DL pathloss reference signal} < \text{PCMAX}-\text{preambleInitialReceivedTargetPowerEDT}-\text{messagePowerOffsetEDT}(-\text{otherOffset})$$

Alternatively, unlike the MO-EDT, in the MT-EDT, the UE may immediately trigger the MT-EDT when receiving a paging message including the indicator without determining the MT-EDT trigger in the RRC layer and the MAC layer. In consideration of one or combination of the following options, the UE may determine the NUL or the SUL to perform the MT-EDT.

Option 2-1: If both the UE and the base station support the SUL and the EDT operation in the SUL, and if the RSRP value of the measured downlink pathloss reference signal is smaller than the rsrp-ThresholdSSB-SUL (or rsrp-ThresholdSSB-SULforEDT), the random access for the EDT may be triggered in the SUL.

Otherwise, if both the UE and the base station support the NUL and the EDT operation in the NUL, and if the RSRP value of the measured downlink pathloss reference signal is greater than or equal to the rsrp-ThresholdSSB-SUL (or rsrp-ThresholdSSB-SULforEDT), the random access for the EDT may be triggered in the NUL.

Otherwise, if information indicating that the EDT is not supported in the SUL is received in the paging message, the random access for RRC establishment may be triggered in the SUL. Otherwise, if information indicating that EDT is not supported in the NUL is received in the paging message, the random access for RRC establishment may be triggered in the NUL.

Option 2-2: If both the UE and the base station support the SUL, and if the RSRP value of the measured downlink pathloss reference signal is smaller than the rsrp-ThresholdSSB-SUL (or rsrp-ThresholdSSB-SULforEDT), the SUL may be selected. If the UE and the base station support the EDT operation in the SUL, the random access for the EDT may be triggered in the SUL. If the EDT operation is not supported, the random access for the RRC establishment may be triggered.

If the conditions for the SUL are not satisfied, if both the UE and the base station support the NUL, and if the RSRP value of the measured downlink pathloss reference signal is greater than or equal to the rsrp-ThresholdSSB-SUL (or rsrp-ThresholdSSB-SULforEDT), the NUL may be selected. If the UE and the base station support the EDT operation in the NUL, the random access for the EDT may be triggered in the NUL. If the EDT operation is not supported, the random access for the RRC establishment may be triggered.

The UE may transmit an EDT-dedicated random access preamble to the base station in the initial BWP or the configured BWP (if configured by the base station) of the selected uplink (step 1130). If deciding to perform the EDT in the SUL, the UE may transmit the EDT-dedicated random access preamble allocated to the SUL to the base station. The base station receiving the preamble may determine that the UE has requested the EDT. The base station may transmit a random access response message (RAR message) to the UE (step 1135). The RAR message may contain scheduling information for the msg3. Although the UE has transmitted the preamble in the SUL, the base station may want to perform the remaining random access operation in the NUL instead of the SUL. For example, when evaluating the received signal strength of the preamble transmitted by the UE, in case where there is no difficulty in performing the remaining random access operation in the NUL, or in case where it is more preferable to perform the remaining random access operation in the NUL in terms of uplink load balancing, the base station may want to perform the remaining random access operation in the NUL instead of the SUL. That is, the base station may want to change the uplink. To this end, the base station may include an indicator indicating the uplink change in the DCI corresponding to the RA-RNTI or include an indicator indicating the uplink change in the UL grant or new field in the RAR message. It is also possible to change from the NUL to the SUL. The UE may include a certain RRC message, RRCResumeRequest message, in the msg3 and transmit it to the base station (step 1140). This message may include resumeIdentity, which is the ID of the UE, and resumeMAC-I. The resumeIdentity is UE ID information required for one base station to obtain a UE context from other base station having the UE context. The resume-MAC-I is token information for UE authentication in the base station. When switching from the connected mode to the inactive mode, the UE may receive an RRCRelease message containing SuspendConfig IE from the base station. The SuspendConfig IE may contain both fullI-RNTI (40 bits) and shortI-RNTI (24 bits) that can be used as the resumeIdentity. The base station indicates, through the system information, an ID to be used as the resumeIdentity to be contained in an RRCResumeRequest message of the UE, that is, either fullI-RNTI or shortI-RNTI. Upon receiving the msg3, the base station may transmit the msg4 including a certain RRC message, an RRCRelease message, to the UE (step 1145). In this case, the SuspendConfig IE may be contained in the RRCRelease message. DTCH containing downlink data to be transmitted may be multiplexed in the msg4. In addition, the network may determine that it may be necessary to transmit/receive additional data that is difficult to deliver in the random access procedure. In this case, because it is desirable to switch the UE to the connected mode, the base station may transmit an RRCSetup message in the msg4 instead of the RRCRelease message upon determining that it is necessary to switch the UE to the connected mode. The RRC message includes information necessary for the UE to switch to the connected mode.

Figure 12:
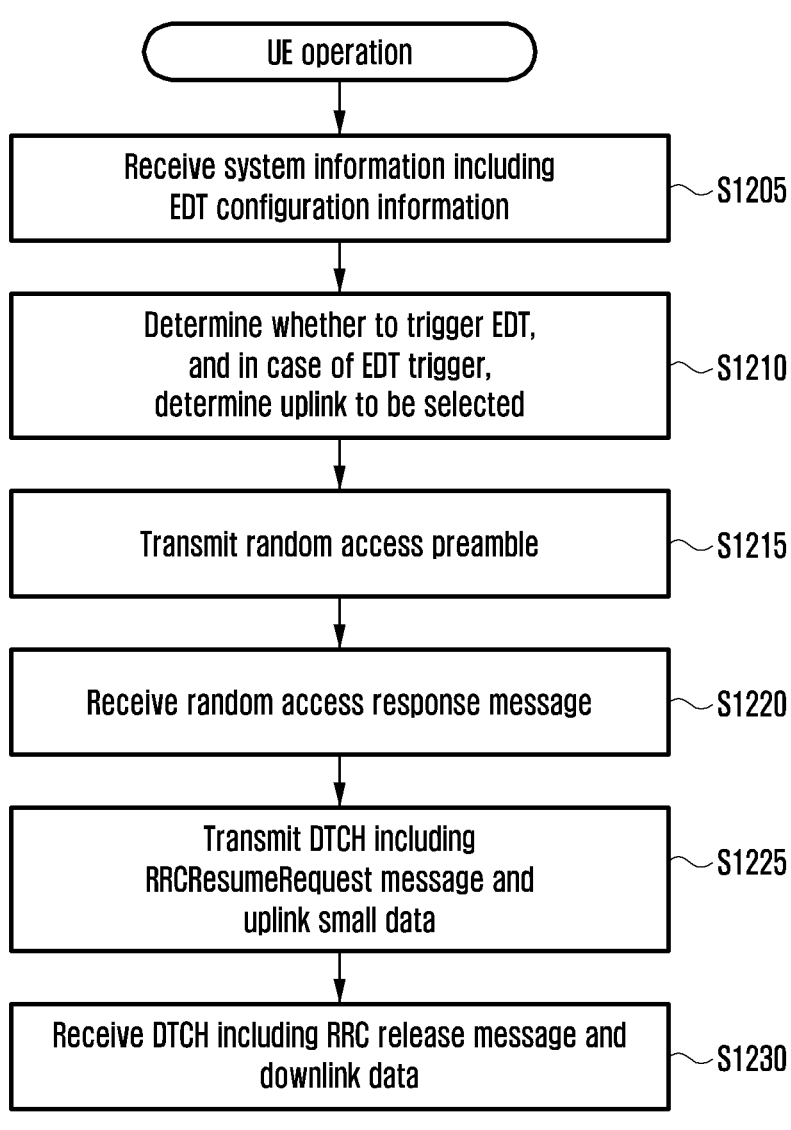
FIG. 12 is a diagram illustrating an operation sequence of a UE performing EDT in the second embodiment of the disclosure.

FIG. 12 is a diagram illustrating an operation sequence of a UE performing EDT in the second embodiment of the disclosure.

At step S1205, the UE may be provided with EDT configuration information from system information broadcast from a base station.

At step S1210, the UE may determine whether to perform EDT according to the method proposed in the disclosure, and may select an uplink for performing the EDT.

At step S1215, the UE may transmit an EDT-dedicated random access preamble in the selected uplink.

At step S1220, the UE may receive a random access response message in a downlink of the base station.

At step S1225, the UE may transmit, in the selected uplink, an msg3 in which a DTCH including user data and an RRCResumeRequest message are multiplexed.

At step S1230, the UE may receive an msg4 including an RRCRelease message from the base station, and the DTCH including user data may be multiplexed.

Figure 13:
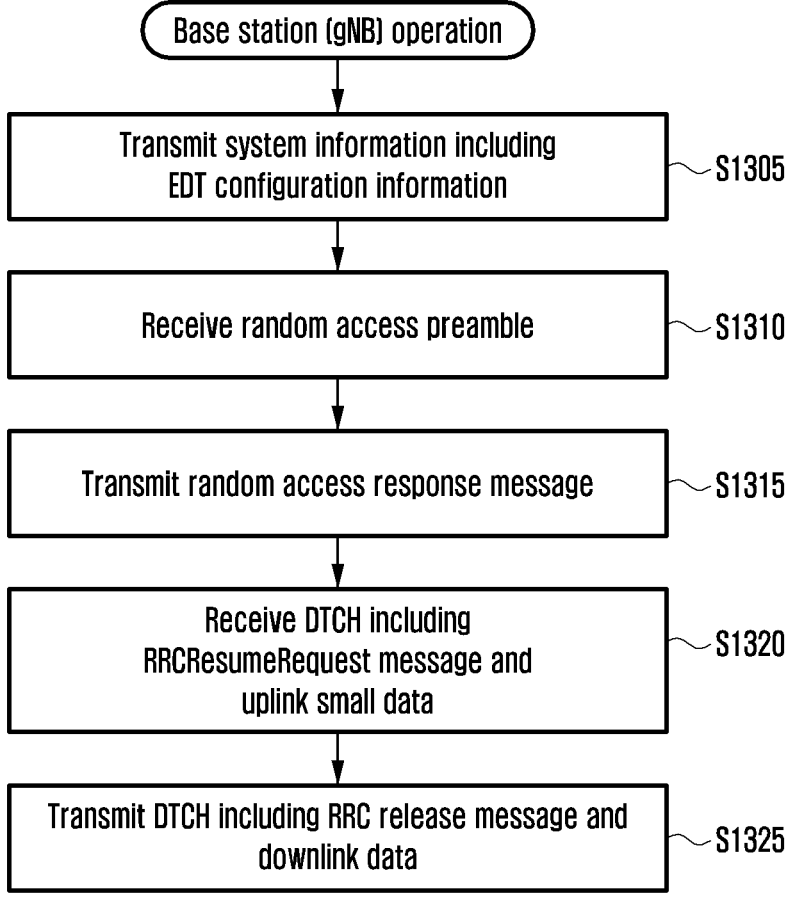
FIG. 13 is a diagram illustrating an operation sequence of a gNB performing EDT in the second embodiment of the disclosure.

FIG. 13 is a diagram illustrating an operation sequence of a gNB performing EDT in the second embodiment of the disclosure.

At step S1305, a base station (gNB) may broadcast EDT configuration information through system information.

At step S1310, the base station may receive an EDT-dedicated random access preamble from one UE in one uplink.

At step S1315, the base station may transmit a random access response message to the UE.

At step S1320, the base station may receive, from the UE in the uplink, an msg3 in which a DTCH including user data and an RRCResumeRequest message are multiplexed.

At step S1325, the base station may transmit an msg4 including an RRCRelease message to the UE. If there is user data to be transmitted, the base station may multiplex the DTCH including the user data to the msg4 and transmit it to the UE.

Figure 14:
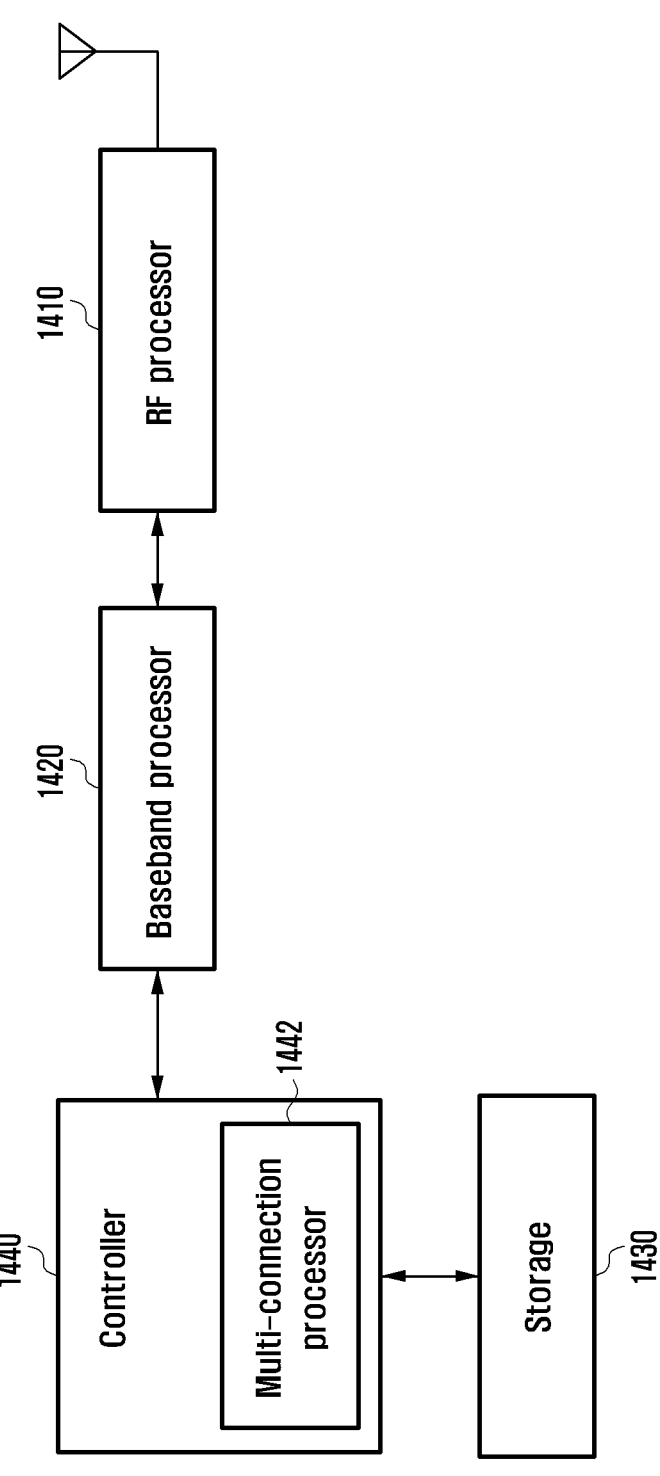
FIG. 14 is a block diagram illustrating an internal structure of a UE according to an embodiment of the disclosure.

FIG. 14 is a block diagram illustrating an internal structure of a UE according to an embodiment of the disclosure.

With reference to the above figure, the UE may include a radio frequency (RF) processor 1410, a baseband processor 1420, a storage 1430, and a controller 1440.

The RF processor 1410 may perform a function for transmitting and receiving a signal through a wireless channel, such as band conversion and amplification of the signal. That is, the RF processor 1410 may up-convert a baseband signal provided from the baseband processor 1420 into an RF band signal and transmit it through an antenna, or down-convert an RF band signal received through the antenna into a baseband signal. For example, the RF processor 1410 may include a transmit filter, a receive filter, an amplifier, a mixer, an oscillator, a digital-to-analog converter (DAC), an analog-to-digital converter (ADC), and the like. In the above figure, only one antenna is shown, but the UE may include a plurality of antennas. Also, the RF processor 1410 may include a plurality of RF chains. Furthermore, the RF processor 1410 may perform beamforming. For the beamforming, the RF processor 1410 may adjust the phase and magnitude of each of signals transmitted and received through a plurality of antennas or antenna elements. In addition, the RF processor may perform MIMO and may receive multiple layers upon performing the MIMO operation.

The baseband processor 1420 may perform a function of conversion between a baseband signal and a bit stream in accordance with a physical layer standard of a system. For example, when transmitting data, the baseband processor 1420 may generate complex symbols by encoding and modulating a bit stream to be transmitted. Also, when receiving data, the baseband processor 1420 may restore a received bit stream by demodulating and decoding a baseband signal provided from the RF processor 1410. For example, in case of complying with an orthogonal frequency division multiplexing (OFDM) scheme, upon data transmission, the baseband processor 1420 may generate complex symbols by encoding and modulating a bit stream to be transmitted, map the complex symbols to subcarriers, and then compose OFDM symbols through an inverse fast Fourier transform (IFFT) operation and cyclic prefix (CP) insertion. Also, upon data reception, the baseband processor 1420 may divide a baseband signal provided from the RF processor 1410 into OFDM symbol units, restore signals mapped to subcarriers through a fast Fourier transform (FFT) operation, and then restore a received bit stream through demodulation and decoding.

The baseband processor 1420 and the RF processor 1410 may transmit and receive signals as described above. Accordingly, the baseband processor 1420 and the RF processor 1410 may be referred to as a transmitter, a receiver, a transceiver, or a communication unit. Furthermore, at least one of the baseband processor 1420 and the RF processor 1410 may include a plurality of communication modules to support a plurality of different wireless access technologies. Also, at least one of the baseband processor 1420 and the RF processor 1410 may include different communication modules to process signals of different frequency bands. For example, the different wireless access technologies may include a wireless LAN (e.g., IEEE 802.11), a cellular network (e.g., LTE), and the like. In addition, the different frequency bands may include a super high frequency (SHF) (e.g., 2. NRHz, NRHz) band and a millimeter wave (e.g., 60 GHz) band.

The storage 1430 may store a default program for the operation of the UE, an application program, and data such as configuration information. In particular, the storage 1430 may store information related to a second access node that performs wireless communication using a second wireless access technology. In addition, the storage 1430 may provide stored data in response to a request of the controller 1440.

The controller 1440 may control the overall operations of the UE. For example, the controller 1440 may transmit and receive a signal through the baseband processor 1420 and the RF processor 1410. In addition, the controller 1440 writes and reads data in the storage 1430. To this end, the controller 1440 may include at least one processor. For example, the controller 1440 may include a communication processor (CP) that controls for communication, and an application processor (AP) that controls an upper layer such as an application program.

FIG. 15 is a block diagram illustrating an internal structure of a base station according to an embodiment of the disclosure.

With reference to the above figure, the base station is configured to include an RF processor 1510, a baseband processor 1520, a backhaul communication unit 1530, a storage 1540, and a controller 1550.

The RF processor 1510 may perform a function for transmitting and receiving a signal through a wireless channel, such as band conversion and amplification of the signal. That is, the RF processor 1510 may up-convert a baseband signal provided from the baseband processor 1520 into an RF band signal and transmit it through an antenna, or down-convert an RF band signal received through the antenna into a baseband signal. For example, the RF processor 1510 may include a transmit filter, a receive filter, an amplifier, a mixer, an oscillator, a DAC, an ADC, and the like. In the above figure, only one antenna is shown, but the first node may include a plurality of antennas. Also, the RF processor 1510 may include a plurality of RF chains. Furthermore, the RF processor 1510 may perform beamforming. For the beamforming, the RF processor 1510 may adjust the phase and magnitude of each of signals transmitted and received through a plurality of antennas or antenna elements. In addition, the RF processor may perform downlink MIMO operation by transmitting at least one layer.

The baseband processor 1520 may perform a function of conversion between a baseband signal and a bit stream in accordance with a physical layer standard of a first radio access technology. For example, when transmitting data, the baseband processor 1520 may generate complex symbols by encoding and modulating a bit stream to be transmitted. Also, when receiving data, the baseband processor 1520 may restore a received bit stream by demodulating and decoding a baseband signal provided from the RF processor 1410. For example, in case of complying with the OFDM scheme, upon data transmission, the baseband processor 1520 may generate complex symbols by encoding and modulating a bit stream to be transmitted, map the complex symbols to subcarriers, and then compose OFDM symbols through the IFFT operation and CP insertion. Also, upon data reception, the baseband processor 1520 may divide a baseband signal provided from the RF processor 1510 into OFDM symbol units, restore signals mapped to subcarriers through the FFT operation, and then restore a received bit stream through demodulation and decoding. The baseband processor 1520 and the RF processor 1510 may transmit and receive signals as described above. Accordingly, the baseband processor 1520 and the RF processor 1510 may be referred to as a transmitter, a receiver, a transceiver, a communication unit, or a wireless communication unit.

The backhaul communication unit 1530 may provide an interface for performing communication with other nodes in the network. That is, the backhaul communication unit 1530 may convert a bit stream transmitted from a main base station to another node, e.g., an auxiliary base station, a core network, etc., into a physical signal, and convert a physical signal received from the other node into a bit stream.

The storage 1540 may store a default program for the operation of the main base station, an application program, and data such as configuration information. In particular, the storage 1540 may store information on a bearer allocated to an accessed UE, a measurement result reported from the accessed UE, and the like. Also, the storage 1540 may store information serving as a criterion for determining whether to provide or stop multiple connections to the UE. In addition, the storage 1540 may provide stored data in response to a request of the controller 1550.

The controller 1550 may control the overall operations of the main base station. For example, the controller 1550 may transmit and receive a signal through the baseband processor 1520 and the RF processor 1510 or through the backhaul communication unit 1530. In addition, the controller 1550 writes and reads data in the storage 1540. To this end, the controller 1550 may include at least one processor.

The embodiments of the disclosure are only examples presented in order to easily explain technical contents and facilitate comprehension of the disclosure, and are not intended to limit the technical scope of the disclosure. Therefore, the technical scope of the disclosure should be construed to include all changes or modifications derived from the technical ideas of various embodiments of the disclosure in addition to the embodiments disclosed herein.

The invention claimed is:

1. A method performed by a terminal in a wireless communication system, the method comprising:

receiving, from a base station, system information (SI) including a first threshold value of a data size, a second threshold value of a reference signal received power (RSRP), and small data transmission (SDT)-dedicated random access preamble information for a supplementary uplink (SUL), wherein the first threshold value is associated with initiating an SDT and the second threshold value is associated with selecting the SUL to perform a random access;

identifying whether a data size is less than or equal to the first threshold value associated with initiating the SDT;

in case that the data size is less than or equal to the first threshold value associated with initiating the SDT, identifying whether an RSRP of a pathloss reference is less than the second threshold value associated with selecting the SUL;

in case that the RSRP of the pathloss reference is less than the second threshold value associated with selecting the SUL, selecting the SUL for the SDT;

determining an SDT-dedicated random access preamble allocated to the SUL based on the SDT-dedicated random access preamble information for the SUL;

transmitting, to the base station, the SDT-dedicated random access preamble allocated to the SUL in an uplink bandwidth part (BWP), in a radio resource control (RRC) inactive state;

as a response to the random access preamble allocated to the SUL, receiving, from the base station, a random access response message including an indicator indicating to change from the SUL to a normal uplink (NUL); and transmitting, to the base station, an RRC resume request message and SDT data via the NUL, wherein the second threshold value is dedicated for performing the SDT and is applied instead of an RSRP threshold value for determining a SUL for a non-SDT random access, wherein in case that a separate bandwidth part (BWP) for the SDT is configured via the SI, the random access preamble allocated to the SUL is transmitted in the separate BWP for the SDT, and wherein in case that the separate BWP for the SDT is not configured via the SI, the random access preamble allocated to the SUL is transmitted in an initial BWP.

2. A method performed by a base station in a wireless communication system, the method comprising:

transmitting, to a terminal, system information (SI) including a first threshold value of a data size and a second threshold value of a reference signal received power (RSRP), and small data transmission (SDT)-dedicated random access preamble information for a supplementary upling (SUL), wherein the first threshold value is associated with initiating an SDT and the second threshold value is associated with selecting the SUL to perform a random access, receiving, from the terminal, an SDT-dedicated random access preamble allocated to the SUL in an uplink bandwidth part (BWP) based on the SDT-dedicated random access preamble information for the SUL;

as a response to the random access preamble allocated to the SUL, transmitting, to the terminal, a random access response message including an indicator indicating to change from the SUL to a normal uplink (NUL); and receiving, from the terminal, a radio resource control (RRC) resume request message and SDT data via the NUL, wherein the SUL for the SDT is selected in case that a data size is less than or equal to the first threshold value associated with initiating the SDT and an RSRP of a pathloss reference is less than the second threshold value associated with selecting the SUL to perform the random access, wherein the second threshold value is dedicated for the SDT and applied instead of an RSRP threshold value for determining a SUL for a non-SDT random access, wherein in case that a separate bandwidth part (BWP) for the SDT is configured via the SI, the random access preamble allocated to the SUL is received in the separate BWP for the SDT, and wherein in case that the separate BWP for the SDT is not configured via the SI, the random access preamble allocated to the SUL is received in an initial BWP for the SDT.

3. A terminal in a wireless communication system, the terminal comprising:

a transceiver; and a controller coupled with the transceiver, and configured to:

receive, from a base station, system information (SI) including a first threshold value of a data size, a second threshold value of a reference signal received power (RSRP), and small data transmission (SDT)-dedicated random access preamble information for a supplementary uplink (SUL), wherein the first threshold value is associated with initiating an SDT and the second threshold value is associated with selecting the SUL to perform a random access, identify whether a data size is less than or equal to the first threshold value associated with initiating the SDT, in case that the data size is less than or equal to the first threshold value associated with initiating the SDT, identify whether an RSRP of a pathloss reference is less than the second threshold value associated with selecting the SUL, in case that the RSRP of the pathloss reference is less than the second threshold value associated with selecting the SUL, select the SUL for the SDT, determine an SDT-dedicated random access preamble allocated to the SUL based on the SDT-dedicated random access preamble information for the SUL, and transmit, to the base station, the SDT-dedicated random access preamble allocated to the SUL in an uplink bandwidth part (BWP), in a radio resource control (RRC) inactive state, as a response to the random access preamble allocated to the SUL, receive, from the base station, a random access response message including an indicator indicating to change from the SUL to a normal uplink (NUL), and transmit, to the base station, an RRC resume request message and SDT data via the NUL, wherein the second threshold value is dedicated for performing the SDT and is applied instead of an RSRP threshold value for determining a SUL for a non-SDT random access, wherein in case that a separate bandwidth part (BWP) for the SDT is configured via the SI, the random access preamble allocated to the SUL is transmitted in the separate BWP for the SDT, and wherein in case that the separate BWP for the SDT is not configured via the SI, the random access preamble allocated to the SUL is transmitted in an initial BWP for the SDT.

4. A base station in a wireless communication system, the base station comprising:

a transceiver; and a controller coupled with the transceiver and configured to:

transmit, to a terminal, system information (SI) including a first threshold value of a data size and a second threshold value of a reference signal received power (RSRP), and small data transmission (SDT)-dedicated random access preamble information for a supplementary uplink (SUL), wherein the first threshold value is associated with initiating an SDT and the second threshold value is associated with selecting the SUL to perform a random access, receive, from the terminal, an SDT-dedicated random access preamble allocated to the SUL in an uplink bandwidth part (BWP) based on the SDT-dedicated random access preamble information for the SUL, as a response to the random access preamble allocated to the SUL, transmit, to the terminal, a random access response message including an indicator indicating to change from the SUL to a normal uplink (NUL), and receive, from the terminal, a radio resource control (RRC) resume request message and SDT data via the NUL, wherein the SUL for the SDT is selected in case that a data size is less than or equal to the first threshold value associated with initiating the SDT and an RSRP of a pathloss reference is less than the second threshold value associated with selecting the SUL to perform the random access, wherein the second threshold value is dedicated for the SDT and applied instead of an RSRP threshold value for determining a SUL for a non-SDT random access, wherein in case that a separate bandwidth part (BWP) for the SDT is configured via the SI, the random access preamble allocated to the SUL is received in the separate BWP for the SDT, and wherein in case that the separate BWP for the SDT is not configured via the SI, the random access preamble allocated to the SUL is received in an initial BWP for the SDT.

* * * * *